Jan. 2, 1945. T. R. HARRISON 2,366,618
MEASURING AND CONTROL APPARATUS
Filed May 14, 1942  5 Sheets-Sheet 1
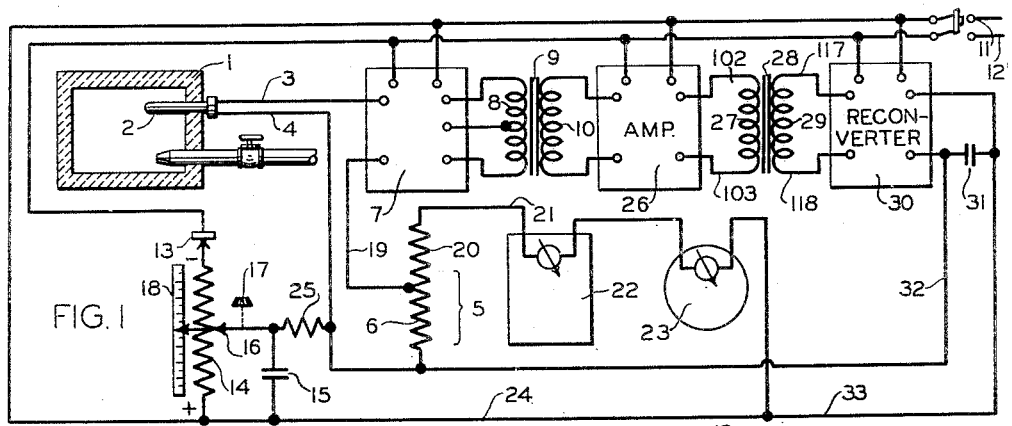
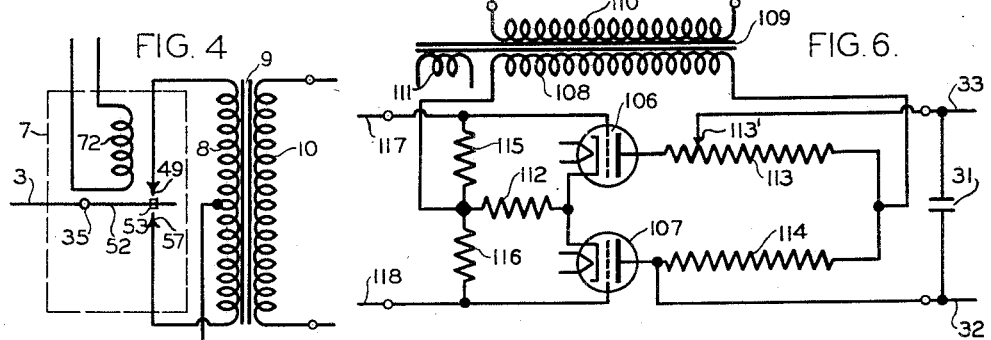
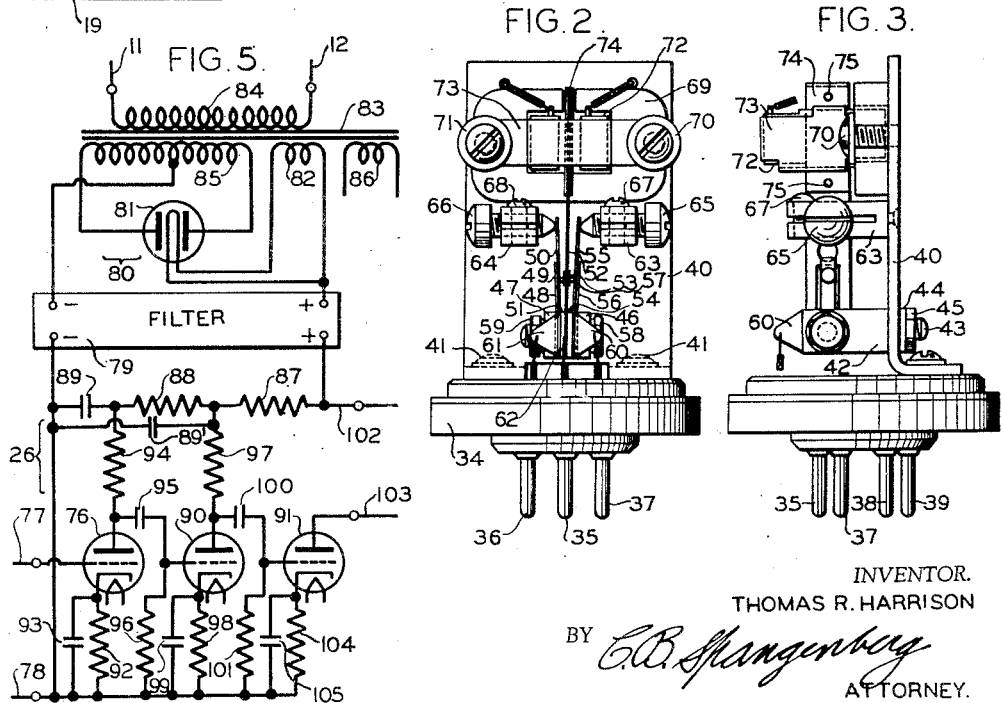
INVENTOR.
THOMAS R. HARRISON
BY C.B. Spangenberg
ATTORNEY.

Jan. 2, 1945.  T. R. HARRISON  2,366,618
MEASURING AND CONTROL APPARATUS
Filed May 14, 1942   5 Sheets-Sheet 2

INVENTOR.
THOMAS R. HARRISON
BY E.B. Spangenburg
ATTORNEY.

Jan. 2, 1945.　　　　T. R. HARRISON　　　　2,366,618
MEASURING AND CONTROL APPARATUS
Filed May 14, 1942　　　5 Sheets-Sheet 4

INVENTOR.
THOMAS R. HARRISON
BY E.B.Spangenberg
ATTORNEY.

Patented Jan. 2, 1945

2,366,618

UNITED STATES PATENT OFFICE 2,366,618

MEASURING AND CONTROL APPARATUS

Thomas R. Harrison, Wyncote, Pa., assignor to The Brown Instrument Company, Philadelphia, Pa., a corporation of Pennsylvania Application May 14, 1942, Serial No. 442,999

21 Claims. (Cl. 236—74)

The present invention relates to apparatus having particular utility in measuring and/or controlling the magnitude and changes in magnitude of a variable condition, and more specifically, to self balancing electrical apparatus which is useful in measuring and/or controlling the magnitude of electrical, thermal, chemical, physical or mechanical quantities or qualities such as electric current, temperature pressure, flow or hydrogen ion content. The present invention is especially useful in pyrometric measuring and controlling apparatus for measuring voltage changes of thermocouples and photovoltaic cells and the like which are exposed to variations in temperature or radiant energy and for effecting desired control operations in accordance with such measurements. The invention is also useful in many other different and varied applications among which may be included measuring and controlling electrolytic conditions of industrial cells and particularly the determination of hydrogen ion content values of cells wherein it is desired to measure small voltage variations accurately and automatically.

An object of the invention is to provide improved measuring apparatus which is capable of continuously indicating, recording and/or controlling the magnitude and changes in magnitude of a variable condition substantially instantaneously with the occurrence of such variations.

Another and more specific object of the invention is to provide self balancing apparatus which is characterized in that the condition responsive means does not require the use of physically movable parts deflecting in accordance with the variations in the condition under measurement whereby the apparatus is capable of measuring accurately the magnitude and changes in magnitude of rapidly varying conditions. Another advantage which is obtained as a result of dispensing with the use of such physically movable parts in the apparatus, which parts in the prior art apparatus are usually extremely delicate and expensive, is that the apparatus is rendered substantially less sensitive to the effects of vibration and shock to which the apparatus may be subjected.

Another and more specific object of the invention is to provide improved apparatus for measuring and/or recording electric potential or current variations of minute magnitude.

A still more specific object of the invention is to provide improved apparatus for measuring and/or recording electric potential or current variations of minute magnitude having different measuring ranges so as to enable a higher degree of accuracy of measurement to be attained.

Another specific object of the invention is to provide improved apparatus for measuring and/or utilizing for control and analogous purposes minute direct currents such as those derived from thermocouples or photovoltaic cells.

In accordance with one embodiment of the present invention a source of direct electric potential to be measured is conductively connected in circuit with a fixed resistance which is traversed by direct current of predetermined magnitude derived from a suitable current source. The potential drop produced across the fixed resistance by the derived direct current is opposed to the direct electric potential to be measured and the derived direct electric potential is preferably made adjustable so that the two potentials may be made to cancel each other out when the electric potential to be measured is approximately midway its normal range of variation. The difference in potential between the two opposed potentials is transformed by a suitable converter into an alternating current which may be readily amplified and the alternating current so derived is impressed on the input circuit of an electronic amplifier, the output circuit of which is also electrically connected to the fixed resistance. The transformation of the differential potential into an alternating voltage is affected by periodically interrupting the differential potential at regular frequency and applying the interrupted quantity to the primary winding of a transformer. By virtue of the action of the transformer an alternating voltage of one phase or of opposite phase depending upon the polarity of the potential difference is induced in the transformer secondary winding. The magnitude of the alternating voltage thus created in the transformer secondary winding varies in accordance with the magnitude of the differential potential.

The derived alternating voltage is impressed on the input circuit of the electronic amplifier and the amplified alternating current is reconverted into a direct current of one polarity or of opposite polarity depending upon the phase of the derived alternating voltage. The direct current output of the reconverter changes the flow of current through the fixed resistance as required to reduce the difference in potential between the potential under measurement and the predetermined potential substantially to zero. The current change in the fixed resistance required to cancel out the differential potential will vary in accordance with the variations in the potential under measurement and may be measured by suitable indicating and/or recording devices to provide an indication and/or record of the variations in the potential of the source under measurement.

Those skilled in the art will recognize from the foregoing explanation and the detailed description given hereinafter that I have provided a self balancing potentiometric instrument which is characterized by the fact that the condition responsive means does not require, nor include, any movable parts deflecting in accordance with the variations in the potential under measurement, and in addition, rebalance of the pontiometer is also effected without requiring the use of any physically movable parts. Furthermore, the rebalancing operation is performed in such manner as to provide a relatively large electric current which varies in direct proportionality with the potential under measurement and may be utilized for the operation of relatively rugged indicating and/or recording apparatus. Such apparatus is especially adapted for accurately indicating and/or recording the variations in rapidly varying conditions. In addition, suitable provisions have been made for varying the range of measurement of the apparatus so as to enable a higher degree of accuracy to be attained.

The various features of novelty which characterize my present invention are pointed out with particularity in the claims annexed to and forming a part of this specification. For a better understanding of the invention, however, its advantages and the specific objects obtained with its use, reference should be had to the accompanying drawings and descriptive matter in which are illustrated and described preferred embodiments of the invention.

Of the drawings:

Fig. 1 is a diagrammatic representation of one embodiment of the invention;

Figs. 2, 3 and 4 illustrate in detail one form of converter which may be utilized in the arrangement of Fig. 1;

Fig. 5 illustrates in detail one form of electronic amplifier which may be utilized for amplifying the alternating current derived by means of the converter shown in Figs. 2-4;

Fig. 6 is a diagrammatic illustration of one firm of reconverter which may be utilized for translating the alternating current output of the amplifier into a direct current of one polarity or of the opposite polarity depending upon the phase of the amplifier alternating current output;

Figure 10:
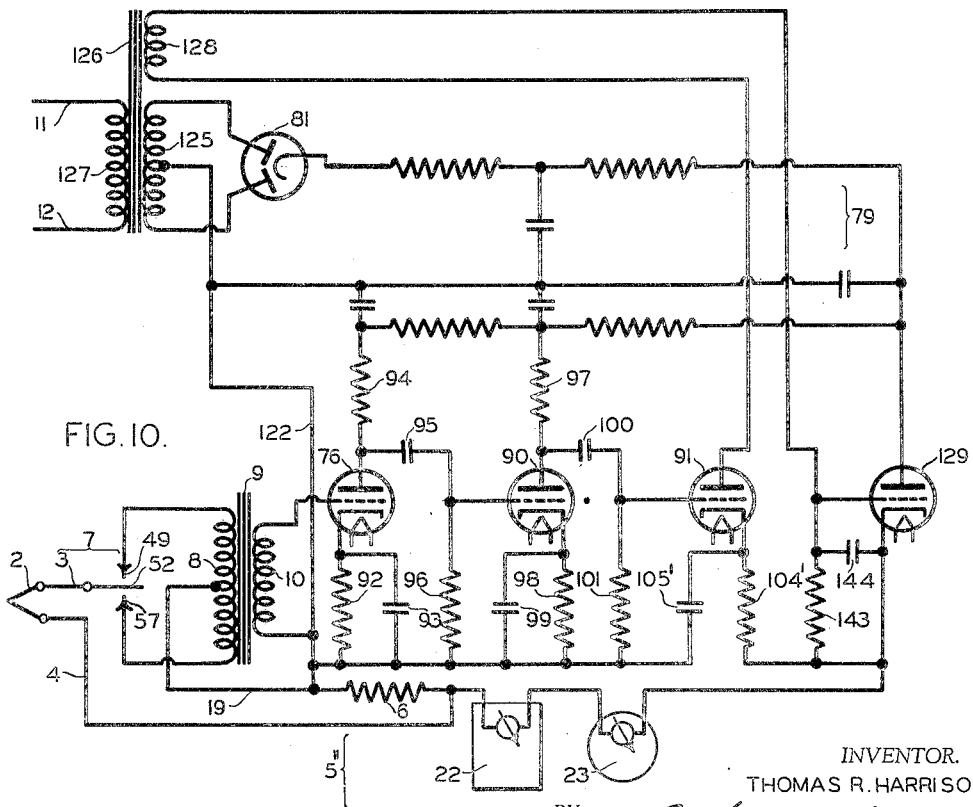
Figure 11:
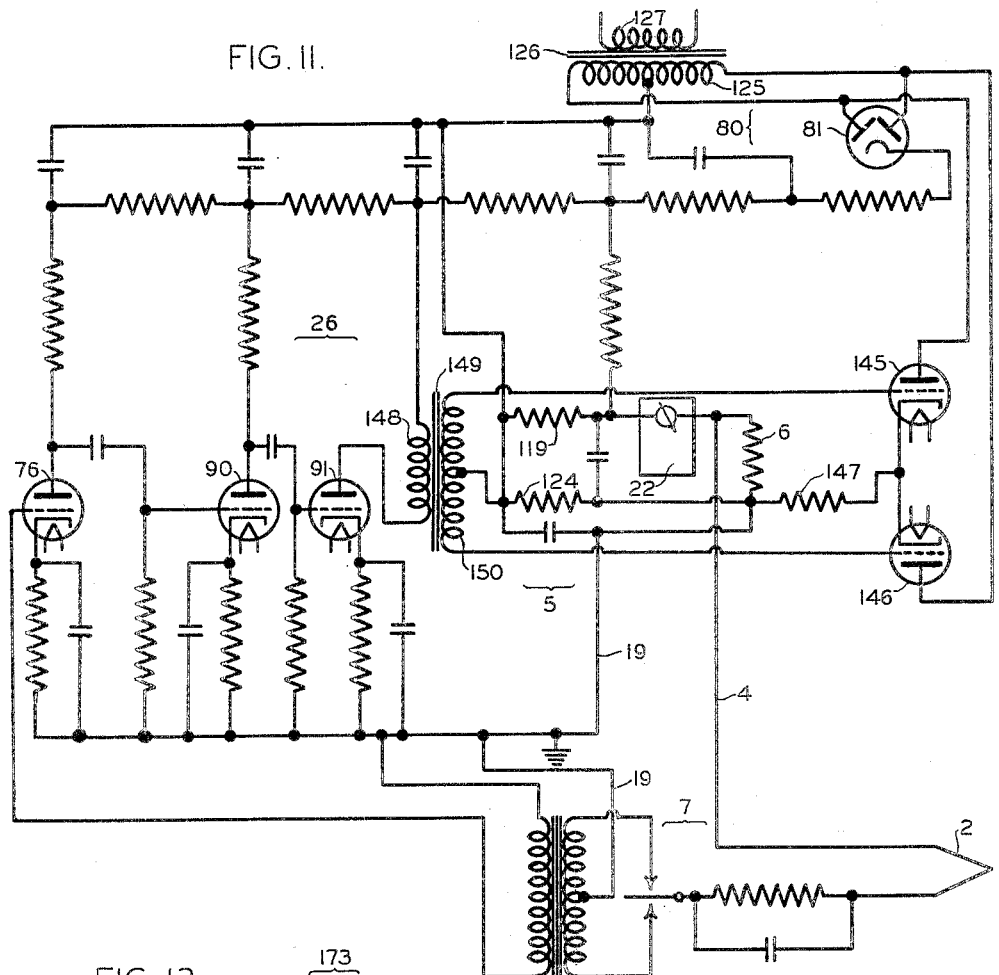
Figure 12:
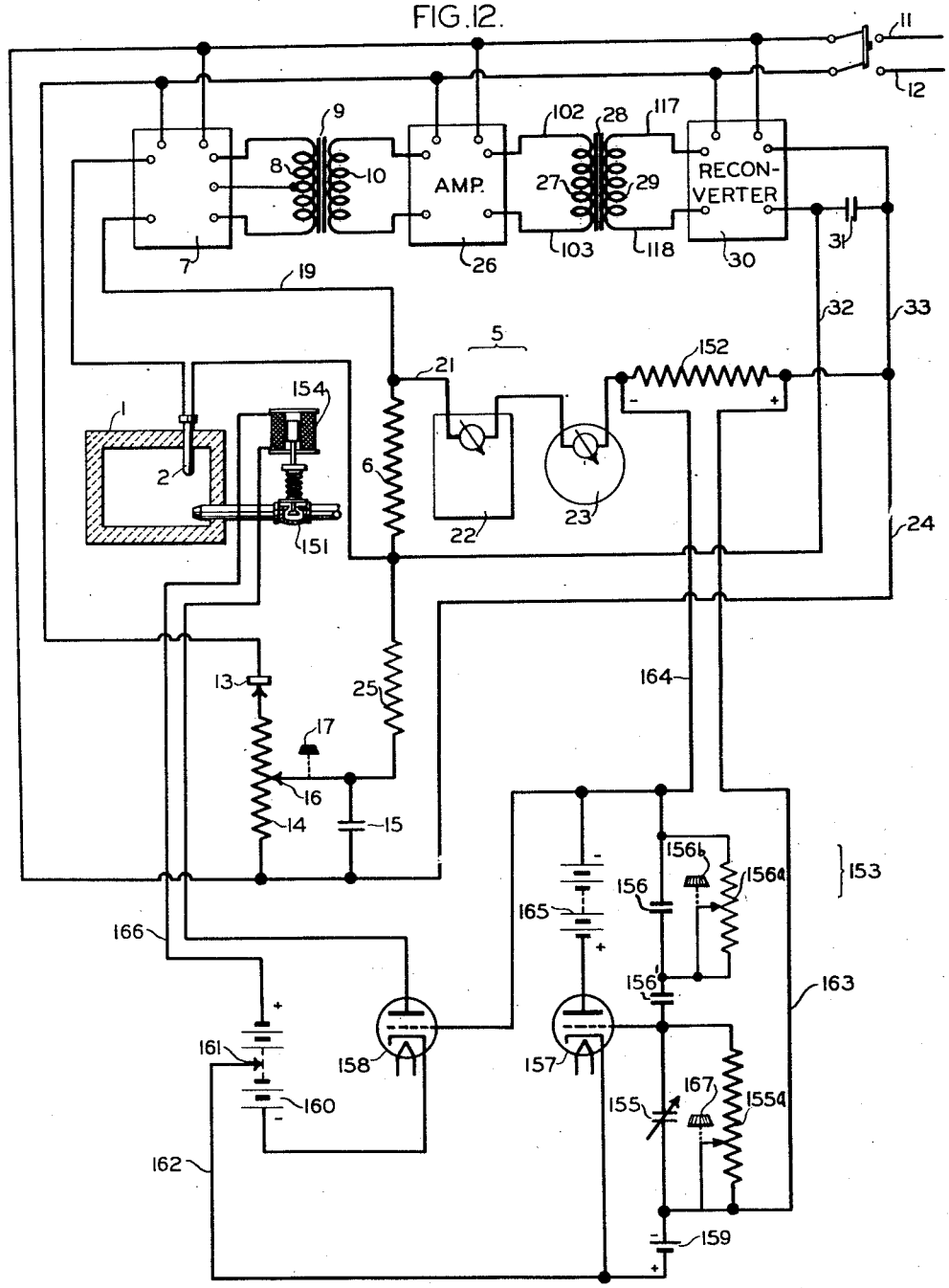

Figs. 7, 8, 9, 10 and 11 each illustrate a different modification of the arrangement of Fig. 1; and Figs. 12 and 13 are diagrammatic representations of the use of the arrangement of Fig. 1 in a control system.

Referring now to Fig. 1 of the drawings, there is illustrated in schematic form an arrangement for indicating and recording the temperature of a furnace 1 in the interior of which a thermocouple 2 is arranged so as to be responsive to slight changes in temperature therein. The thermocouple, which may be located at a distance from the remainder of the measuring apparatus, is connected by a pair of conductors 3 and 4 into a potentiometric network indicated generally by the reference numeral 5. The potentiometric network 5 also has connected therein a fixed resistance 6, an interrupter or converting device 7 and the primary winding 8 of a transformer 9 having secondary winding 10. The interrupter or converting device 7 is described in detail hereinafter in connection with Figs. 2, 3 and 4. In the arrangement of Fig. 1 the electromotive force developed by the thermocouple 2 is opposed to the potential drop produced across the fixed resistance 6 by a flow of direct current of predetermined magnitude therethrough. The direct current of predetermined magnitude through the resistance 6 is derived from alternating current mains 11 and 12 by means of a rectifier 13 and an adjustable resistance 14 which are connected in series across the alternating current mains 11 and 12. A condenser 15 is connected in shunt to resistance 14. The rectifier 13, which is a half wave rectifier and may be of the copper oxide type, is connected in series with the resistance 14 across the alternating current supply mains 11 and 12. Since the rectifier 13 is adapted to conduct current in one direction only, a unidirectional potential drop is produced across the resistance 14 and a portion of this potential drop depending upon the position of contact 16 along the resistance 14 is utilized for creating a current flow through resistance 6 and thereby a potential drop across the latter which is opposed to the electromotive force developed by the thermocouple 2 through a circuit which may be traced from one terminal of thermocouple 2, to conductor 3, interrupter 7 and transformer primary winding 8, conductor 19, resistance 6, and conductor 4 to the other terminal of thermocouple 2. The portion of the potential drop tapped off the resistance 14 may be adjusted as desired by means of the manipulation of a knob 17 and as shown a scale 18 disposed alongside the resistance 14 may be provided for the purpose of indicating the portion of the potential drop tapped off the resistance 14. The condenser 15 is provided for smoothing out the pulsations or ripple in the unidirectional potential drop maintained across the resistance 14 so that a substantially smooth direct current flow is created in the resistance 6 for producing a steady potential drop in opposition to the electromotive force produced by the thermocouple 2. The condenser 15 is employed as a filter. It will be apparent that if additional stages of filtering are required such additional stages of filtering can be utilized.

The current established in resistance 6 by the variable part of the potential drop tapped off the resistance 14 flows through a circuit which may be traced from the contact 16 through a resistance 25, resistance 6, a resistance 20, a conductor 21 in which a milliammeter recorder 22 and a milliammeter indicator 23 are connected, and a conductor 24 to the lower terminal of the resistance 14. The contact 16 is preferably so adjusted along the length of the resistor 14 that the potential drop created across resistance 6 by the flow of current therethrough is approximately equal to that electromotive force which is midway the normal range of variation of the thermocouple electromotive force. At this value of the thermocouple electromotive force the opposed potentials are exactly equal and opposite, and therefore, the difference between those potentials is then zero. The current flow through resistance 6 required to establish this condition will be indicated by the milliammeter recorder 22 and the milliammeter indicator 23.

In accordance with the arrangement of Fig. 1 the difference in potential between that developed by the thermocouple 2 and that produced across resistance 6 is translated by means of the interrupter 7 and the transformer 9 into an alternating current of one phase or of opposite phase depending upon the polarity of the said differential potential and thereby upon the direction of the change in the electromotive force produced by the thermocouple 2. The alternating potential so derived in the secondary winding 10 of the transformer 9 also varies in accordance with the magnitude of the differential potential and is applied to the input terminals of an electronic amplifier 26 which is described in detail in connection with Fig. 5. The alternating current output of the electronic amplifier 26 is applied to the primary winding 27 of a transformer 28 having a secondary winding 29. The secondary winding 29 is connected to the input terminals of an electronic device or reconverter 30, described in detail in connection with Fig. 6, which operates to translate the alternating current impressed on its input terminals into a direct current of one polarity or of the opposite polarity depending upon the phase of the impressed alternating current. In addition the amplitude of the direct current output of the electronic device 30 varies in accordance with the magnitude of the alternating current impressed on the input terminals thereof. A condenser 31 is connected across the output terminals of the device 30 for the purpose of smoothing out the pulsations or ripple in the direct current output of the device 30, and if desired, additional stages of filtering may be provided for this purpose.

The direct current derived from the output circuit of the electronic device 30 is impressed on the resistance 6 through a circuit which may be traced from the lower output terminal of the device 30 to a conductor 32, resistance 6, resistance 20, conductor 21, recorder 22, indicator 23 and a conductor 33 to the upper output terminal of the device 30. The output terminals of the reconverter 30 are so related to the resistor 6 that the potential drop produced across the latter by the reconverter output current is of the proper polarity to cancel out the difference in potential between that produced by thermocouple 2 and that created across resistance 6 by the resistor 14.

It is noted that in order to maintain a direct current output from the reconverter 30 it is necessary to maintain an alternating potential impressed on the input circuit of the electronic amplifier 26, and accordingly, to maintain some unbalance in the potentiometric network 5. The degree of unbalance of the potentiometric network 5 required to maintain a direct current output from the reconverter 30 throughout the range of the apparatus is extremely slight, however, and for all practical purposes the direct current output of the device 30 may be considered as actually rebalancing the potentiometric network 5, that is, reducing the unbalanced electromotive forces therein practically to zero.

The milliammeter recorder 22 and the milliammeter indicator 23 are provided in the output circuit of the reconverter 30 to measure the algebraic sum of the currents supplied to the resistor 6 from resistance 14 and from the reconverter 30. It will be apparent to those skilled in the art that the current flow through the resistance 6 from the resistance 14 and the reconverter 30 which is required to rebalance the potentiometric network 5 will provide a measure of the temperature to which the thermocouple 2 is subjected. In addition, it will be clear that the milliammeter readings may be calibrated in terms of temperature to thereby provide a record or indication of the temperature within the interior of the furnace 1 to which the thermocouple 2 is subjected.

When the electromotive force developed by the thermocouple 2 is exactly that value which is maintained across resistance 6, the differential between the two opposed potentials will be zero, and therefore, the alternating current induced in the transformer secondary winding 10 and impressed on the input circuit of the amplifier 26 will also be zero. Under this condition the direct current output from the reconverter 30 will also be zero. In this condition of operation of the measuring apparatus it will be noted that the potentiometric network 5 is precisely balanced.

Upon a change in the electromotive force developed by the thermocouple 2 the state of precise balance of the potentiometric network 5 will be disturbed and a difference in potential between the two opposed potentials will be produced. This difference in potential is translated by the interrupter 7 and the transformer 9 into an alternating current of one phase or of opposite phase depending upon the polarity of the said difference in potential and thereby upon the direction of the change of the thermocouple electromotive force. This derived alternating electromotive force is amplified by the amplifier 26 and is translated by the reconverter 30 into a direct current of one polarity or of opposite polarity depending upon the phase of the derived alternating current. The output current from the reconverter 30 operates to produce a potential drop across the resistor 6 which is in opposition to the potentiometer unbalanced potentials and thereby tends to restore the state of balance of the potentiometer. The value of output current from reconverter 30 required to restore the state of balance of the potentiometer 5 is dependent upon the extent to which the electromotive force developed by the thermocouple 2 has changed, and therefore, the indications of the milliammeter instruments 22 and 23 provide a measure of the new furnace temperature. As noted above, for this new value of furnace temperature and electromotive force produced by the thermocouple 2 the potentiometric network 5 is not precisely balanced since some slight unbalance of the potentiometer network is required to maintain the output current from the reconverter 30. For all practical purposes, however, the extent of unbalance of the potentiometric network 5 required to maintain this output current from the device 30 is negligible and therefore the potentiometric network 5, in reality, is substantially rebalanced.

From the foregoing description it will be clear that the device from my present invention is a self balancing potentiometric network which is adapted to be continuously restored to a state of equilibrium by means responsive to potentiometric unbalance without requiring the use of physically movable apparatus such as galvanometers or similar devices for detecting the state of balance of the potentiometric network. In addition, the potentiometric network is rebalanced or restored to a stabilized state without requiring the use of any physically movable apparatus whatever for this purpose. The device of my present invention includes a further advantageous feature in that the range of measurement of the apparatus may be adjusted by means of the knob 17 so as to enable a higher degree of accuracy to be attained over a portion or portions of the range of variation of the electromotive force developed by the thermocouple 2.

As pointed out hereinbefore, the interrupter or converter 7 illustrated schematically in Fig. 1 and in detail in Figs. 2, 3 and 4 operates to convert the potentiometric unbalanced direct currents into pulsating currents capable of being readily amplified. It will be understood that any suitable form of circuit interrupter may be employed but in order to illustrate an operative embodiment of the invention the interrupter shown in detail in Figs. 2, 3 and 4 may be utilized.

The interrupter 7 illustrated in Figs. 2, 3 and 4 is of the type shown and described in application Serial No. 421,176 and filed by Frederick W. Side on December 1, 1941. The interrupter 7 as shown in Figs. 2 and 3 is provided with a base 34 in which are mounted terminals 35, 36, 37, 38 and 39. A supporting plate 40 is secured to the base 34 by means of screws 41. A stud 42 provided with a screw threaded extension 43 is secured to the lower end of the supporting plate 40 by means of a lock washer 44 and a nut 45. The free end of the stud 42 is bifurcated having spaced apart ends 46 and 47. Located between the spaced apart ends 46 and 47 are an insulating pad (not shown), a spring contact arm 48 carrying a contact 49, a resilient stop 50 and an insulating pad 51, a vibrating reed 52 carrying a contact 53, an insulating pad 54, a resilient stop 55, a spring contact arm 56 carrying a contact 57 and an insulating pad (not shown). These elements are all clamped between the spaced apart ends 46 and 47 by a bolt 58 and a nut 59. The spring contact arms 48 and 56 are provided with ears 60 and 61, respectively, which are electrically connected to the terminals 36 and 37, respectively. The vibrating reed 52 is provided with an ear 62 which is electrically connected to the terminal 35. Riveted to the supporting plate 40 are also studs 63 and 64 which carry adjustable stops in the form of screws 65 and 66 formed of insulating material. When the adjustable stops 65 and 66 have been adjusted as desired, they are clamped in place by means of screws 67 and 68, respectively. The spring contact arm 56 carrying the contact 57 through its own resiliency engages the resilient stop 55 and the resilient stop 55 through its resiliency engages the adjustable stop 65. In like manner the spring contact arm 48 engages the resilient stop 50 which in turn engages the adjustable stop 66. By adjusting the adjustable stops 65 and 66 the positions of the contacts 57 and 49 may be independently adjusted with respect to the contact 53 carried by the vibrating reed 52.

A permanent magnet 69 is secured to the supporting plate 40 by screws 70 and 71. A coil 72 is held in place by a bracket 73 which in turn is secured in place by the screws 70 and 71. The end of the vibrating reed 52 is disposed within the coil 72 and is provided with an armature 74 which is riveted to the vibrating reed 52 by rivets 75.

The coil 72 is energized with alternating current and acts on the armature 74 to vibrate the reed 52 at 60 cycles per second when the alternating current supplied by the mains 11 and 12 is 60 cycle alternating current to cause the contact 53 to engage and disengage with the contacts 57 and 49. The permanent magnet 69 operates in conjunction with the coil 72 and the armature 74 in such a manner as to cause the armature 74 to vibrate in synchronism with the alternating current supplied by the mains 11 and 12. By adjusting the adjustable stops 65 and 66, and hence the contacts 57 and 49, the wave form produced by the contacts 49, 53 and 57 may be adjusted to the desired value and shape. The contacts 49 and 57 are preferably so adjusted that when the contact 53 is in its stationary position it engages both contacts 49 and 57. This provides an overlapping action which compensates for wear of the contacts, and also contributes to the elimination of stray electrical effects on the operation of the apparatus. Due to this overlapping action also wear of the contacts does not materially alter the wave form produced by the contacts. By mounting the contacts 49 and 57 on the spring contact arms 48 and 56, respectively, good wiping contact is at all times provided between the contact 53 and the contacts 49 and 57. An electrical connection may desirably be provided between one of the screws 41 and ground so that the various parts of the interrupter are connected to ground to maintain the interrupter at ground potential. A cover not shown may also desirably be provided for enclosing the movable parts of the interrupter. Such a cover may be held in place on the base 34 by means of a rolled flange clamping the cover to the base. Such a cover will act to prevent dirt and corrosive atmosphere from affecting the parts of the vibrator.

The interrupter 7 is essentially a polarized switching mechanism, the operating winding 72 and the permanent magnet 69 cooperating to vibrate the vibrating reed 52 at 60 cycles per second in synchronism with the 60 cycle alternating current supply. For purposes of explanation it may be assumed that the contact 57 is engaged by the contact 53 during the first half cycle of the alternating current supply when the voltage is positive and the second contact 49 is engaged by the contact 53 during the second half cycle when the voltage of the alternating current supply is negative. Accordingly, the contacts 53 and 57 engage when the voltage of the alternating current supply is positive and the contacts 53 and 49 engage when the voltage of the alternating current supply is negative. When the vibrating reed 52 is stationary in its mid position both contacts 49 and 57 are engaged by the contact 53 so that when the vibrating reed is operated the contact 53 is always in engagement with one or the other of the contacts 49 and 57.

The manner of connection of the interrupter 7 to the primary winding 8 of the transformer 9 is schematically shown in Fig. 4. By reference to Fig. 4 it will be noted that the contact 49 is connected to one end terminal of the transformer primary winding 8 and the contact 57 is connected to the other end terminal of the winding 8. The contact 53 is connected through the reed 52 and the terminal 35 to the conductor 3 of the potentiometric circuit 5 and the conductor 19 of the potentiometric circuit is connected to a center tap on the transformer primary winding 8.

When the potentiometric network 5 is balanced no current flows in the potentiometric network and accordingly operation of the interrupter 7 is ineffective. When the electromotive force developed by the thermocouple 2 increases to unbalance the potentiometric network 5 in one direction, however, the unbalanced potentiometric direct currents flow in the direction from the transformer 9 to the interrupter 7, and conversely when the electromotive force developed by the thermocouple 2 decreases to unbalance the potentiometric network 5 in the opposite direction the potentiometric unbalanced direct currents flow in the direction from the interrupter 7 to the transformer 9.

More specifically upon unbalance of the potentiometric network 5 in the direction to render the conductor 19 positive with respect to the potential of the conductor 3, unbalanced current, during the first half cycle of the alternating current supplied by lines 11 and 12, will flow from the conductor 19 to the midpoint of the transformer primary winding 8, through the lower half of the winding 8 to the contact 57, to contact 53 and the reed 52 to the conductor 3. During the second half cycle of the alternating current supply, current will flow from the conductor 19 to the midpoint of the transformer primary winding 8, through the upper half of the winding 8 to contact 49, to contact 53 and through the vibrating reed 52 to the conductor 3. The pulsating direct current flows through the transformer primary winding 8, first through the lower half of the winding and then through the upper half of the winding, and acts through the core structure of the transformer 9, to introduce an alternating voltage in the transformer secondary winding 10 having a predetermined phase relatively to the phase of the alternating current supplied by the mains 11 and 12.

Upon unbalance of the potentiometric network 5 in the opposite direction the conductor 3 will be rendered positive with respect to the conductor 19, and therefore, the current flows through the transformer primary winding 8 will alternately be from the lower end of the winding to the mid-point when the contacts 53 and 57 are in engagement and from the upper end of the winding to the mid-point when the contacts 49 and 53 are in engagement. These pulsating direct current flows through the transformer primary winding 8 are in the opposite direction from what they were when the potentiometric network was unbalanced in the opposite direction, and as a result, these pulsating direct current flows operate through the core structure of the transformer 9 to induce an alternating voltage in the transformer secondary winding 10 which is of the opposite phase relatively to the voltage of the alternating current supply mains 11 and 12.

Accordingly, when the potentiometric network 5 is unbalanced in one direction an alternating voltage of one phase relatively to the voltage of the supply mains 11 and 12 is induced in the transformer secondary winding 10 and when the potentiometric network 5 is unbalanced in the opposite direction an alternating voltage of the opposite phase relatively to the voltage of the supply mains 11 and 12 is induced in the transformer secondary winding 10. When the potentiometric network 5 is precisely balanced, there is no current flow through the primary winding 8 of the transformer 9, and hence, the alternating voltage derived in the transformer secondary winding 10 is zero.

The electronic amplifier 26 referred to is illustrated in detail in Fig. 5 and includes an electronic valve 76 which is preferably a heater type high mu triode having an anode, cathode and a control electrode. The input circuit of valve 76 is connected by conductors 77 and 78 to the terminals of the transformer secondary winding 10. Anode voltage is applied to the valve 76 from a rectifier 80 through a suitable filter 79 which is connected in circuit between the valve 76 and the rectifier 80. The rectifier 80 is a conventional full wave rectifier employing a rectifier valve 81 including two heater type diodes in one envelope. Energizing current is supplied the heater filaments of the diodes from the low voltage secondary winding 82 of a transformer 83 which also includes a line voltage primary winding 84, a high voltage secondary winding 85 and a second low voltage secondary winding 86. The anode of one diode of valve 81 is connected to one terminal of secondary winding 85 and the anode of the second diode is connected to the other terminal of the winding. The cathode of the diodes is comprised of the heater filament which is energized from the transformer secondary winding 82 and is common to both of the diodes. The cathode of the rectifier is connected to the positive input terminal of the filter 79 and the negative input terminal of the latter is connected to a center tap on the transformer secondary winding 85. The negative terminal of the filter may desirably be connected to ground potential. The filter 79 may be of any suitable type and has its positive output terminal connected through resistances 87 and 88 and a condenser 89 to its negative output terminal. Resistances 87 and 88 in conjunction with condensers 89 and 89' provide additional filtering for the plate current supply for the triodes of the first and second stages of the amplifier.

Energizing current is supplied the heater filament of the electronic valve 76 from the low voltage secondary winding 86 through conductors not shown in order not to confuse the drawings. The transformer secondary winding 86 further supplies energizing current to the heater filaments of electronic valves 90 and 91. The flow of anode current through the electronic valve 76 is normally maintained at a mean value by virtue of the action of a cathode biasing resistance 92 and a condenser 93 connected in shunt to the resistance 92.

When an alternating potential appears across the terminals of the transformer secondary winding 10, the conductivity of the valve 76 is alternately decreased and increased resulting in a pulsating potential drop appearing across a resistance 94 connected in the output circuit of the valve 76. The output circuit for the valve 76 may be traced from the positive output terminal of the filter 79 through resistors 87, 88 and 94 to the anode of valve 76, the cathode thereof, and the cathode biasing resistance 92 and shunt condenser 93 to the negative terminal of the filter.

A resistance-capacity coupling is provided between the output circuit of the tube 76 and the input circuit of tube 90 by a condenser 95 and a resistance 96. The valve 90 is a heater type valve and includes anode, cathode, and control elements. Anode voltage is supplied the valve 90 from the positive terminal of the filter through the resistance 87, a resistance 97, the anode of valve 90, the cathode, and a cathode biasing resistance 98 which is shunted by a condenser 99 to the negative terminal of the filter.

The output circuit of the valve 90 is resistance-capacity coupled by a condenser 100 and a resistance 101 to the input circuit of the electronic valve 91 and the output circuit of the latter is connected to the terminals of the primary winding 27 of the transformer 28. The output circuit of the valve 91 may be traced from the positive terminal of the filter 79 to a conductor 102, the transformer primary winding 27 as may be seen by referring to Fig. 1, a conductor 103 to the anode of valve 91, the cathode of valve 91, and a biasing resistance 104 shunted by a condenser 105 to the negative terminal of the filter.

Thus, when an alternating voltage of one phase or of opposite phase is impressed upon the input circuit of the electronic valve 76 an alternating voltage of corresponding phase is produced in the secondary winding 29 of the transformer 28.

The reconverter 30 which is employed to transform the alternating current output of one phase or of opposite phase from the electronic amplifier 26 into a direct current of one polarity or of opposite polarity is illustrated in detail in Fig. 6. As shown in Fig. 6, the reconverter 30 comprises a pair of electronic valves 106 and 107 which are heater type triodes having anode, cathode, and control electrode elements and the output circuits of which are energized in parallel from the secondary winding 108 of a transformer 109 having a line voltage primary winding 110 which is connected to alternating current supply means 11 and 12, and a low voltage secondary winding 111. The cathodes of the triodes 106 and 107 are connected together and are also connected through a biasing resistance 112 to the left end terminal of the transformer secondary winding 108. The anode of the valve 106 is connected through a resistance 113 to the right end terminal of the transformer secondary winding 108 and the anode of the valve 107 is connected to the latter terminal through a resistance 114. Thus, the output circuits of the electronic valves 106 and 107 are energized in phase with alternating current of the frequency of the supply lines 11 and 12.

The input circuit of the electronic valve 106 includes the cathode biasing resistance 112, and a resistance 115 which is connected between the negative terminal of the resistance 112 and the control electrode, and the input circuit of the valve 107 includes the resistance 112 and a resistance 116 which is connected between the negative terminal of the resistance 112 and the control electrode of valve 107. The alternating current output from the transformer secondary winding 29 is impressed on the resistances 115 and 116 in series by means of conductors 117 and 118 and is either in phase with the alternating voltage applied to the output circuits of the valves 106 and 107 or is displaced 180° therewith. Such phase relation is readily obtained by virtue of the fact that the electronic amplifier 26 and the reconverter 30 are both energized from the same alternating current supply source.

One output terminal of the reconverter 30 is connected from the point of engagement of a contact 113' which is in engagement with and is slideable along the resistance 113 to the conductor 33 and the other output terminal of the reconverter 30 is connected from the point of engagement of the resistance 114 and the anode of valve 107. When the alternating voltage impressed across the resistances 115 and 116 by the transformer secondary winding is zero the control electrodes of both of the valves 106 and 107 will be at the same potential, namely at the potential at the negative end of the resistance 112, and consequently the valves 106 and 107 will be equally conductive. The resistances 113 and 114 are of the same value, and therefore, the anodes of valves 106 and 107 will then be at the same potential. The contact 113' may be manually adjusted along the resistance 113 in unison with adjustments of the contact 16 along the slide wire resistance 14 in such manner that when the anodes of valves 106 and 107 are at equal potential, the potential between the contact 113' and the anode of valve 107 is equal to the potential tapped off the slide wire resistance 14 by contact 16. Since these potentials are connected in opposition, no current is drawn from the reconverter 30 through conductors 32 and 33. Under this condition the current which flows through resistors 6 and 20 and the milliammeter instruments 22 and 23 is all of the current drawn from the resistance 14 and through resistance 25. Stated differently, the current through the resistance 25 is then the same current which flows through resistances 6 and 20 and the instruments 22 and 23. In accordance with this embodiment of the present invention, it is contemplated that this current flow through resistance 6 produces a potential drop across the latter of the required value to exactly balance the normal operating value of thermocouple electromotive force.

When an alternating current of one phase relatively to the phase of the current supplied by the mains 11 and 12 is impressed across the resistances 115 and 116 as a result of a reduction in the electromotive force produced by the thermocouple 2, however, the control electrode of valve 106 will be rendered less negative during the half cycle when the anode of that valve is positive while the control electrode of the other valve will be rendered more negative during the half cycle when its associated anode is positive. Accordingly, the valve 106 will then be rendered more conductive than the valve 107. Under this condition the potential drop across the valve 106 is less than the potential drop across valve 107, whereby, the output terminal of the reconverter which is connected to the conductor 33 will be rendered somewhat less positive with respect to the output terminal connected to the conductor 32. This will divert part of the current, which previously flowed through resistances 6 and 20 and instruments 22 and 23 from resistance 14, through the conductor 33, reconverter 30, conductor 32 and resistance 25 to resistance 14. Therefore, the effect of the application of an alternating current of the phase referred to the input circuit of valves 106 and 107 is to reduce the current flow through resistances 6 and 20 and instruments 22 and 23. This reduced current flow through resistance 6 creates a reduced potential drop across the resistance 6 of the required value to substantially rebalance the potentiometer 5.

When an alternating voltage of the opposite phase is impressed across the resistances 115 and 116 as a result of an increase in the thermocouple electromotive force, the control electrode of the valve 107 will be rendered less negative with respect to its associated anode during the half cycle when the latter is positive while the potential of the control electrode of the valve 106 will be rendered more negative relatively to its associated anode when the latter is positive. Consequently, the valve 107 for this condition will be rendered more conductive than the valve 106. The potential drop across the valve 107 is then less than that across valve 106 and as a result the output terminal of the reconverter connected to the conductor 32 will be rendered more positive with respect to the output terminal connected to the conductor 32. As a result of this increased potential between conductors 33 and 32, current will flow through resistances 6 and 20 and instruments 22 and 23 from the reconverter 30 which will supplement that through these elements from resistance 14. The effect of this increased current flow through resistance 6 is to produce an increased potential drop across the latter as required to substantially rebalance the potentiometer 5.

From the foregoing description it will be apparent that the current for maintaining the potentiometer 5 in a balanced condition is wholly derived from the resistance 14 when the thermocouple electromotive force is its normal operating value, and that no current is then drawn from the reconverter 30 for this purpose. Upon unbalance of the potentiometer 5 in one direction the reconverter 30 operates to divert part of the current flow through resistance 6 to effect potentiometer rebalance, and upon unbalance of the potentiometer in the opposite direction, the reconverter 30 operates to supply additional current to resistance 6 to effect potentiometer rebalance. Such additional current need be only a small part of the total current required in resistance 6 to balance the potentiometer.

The condenser 31 is provided for the purpose of soothing out the pulsations or ripple in the direct current flow derived from the output circuit of the reconverter 30. It will be clear that additional stages of filtering may be employed, if desired.

It will be noted that the condition of drawing minimum current from the reconverter 30 may be adjusted to correspond to different normal operating values of thermocouple electromotive force as desired, by moving the contact 16 to the position along slidewire resistance 14. For the most perfect attainment of this condition, from a theoretical standpoint, the contact 113' should be adjusted along resistance 113 to a position corresponding to the position of the contact 16 along resistance 14. To this end, the contacts 16 and 113' may desirably be mechanically connected so that their adjustment may be effected simultaneously by a single manipulation. Such refinement is not ordinarily required in many industrial applications, however, and therefore, the feature of adjustability of contact 113' along resistance 113 may be dispensed with. In addition, it is ordinarily sufficient to permanently connect the conductor 33 to the anode of valve 106 when the resistances 113 and 114 are of equal magnitude.

As will be understood by those skilled in the art, the contact 113' may be adjusted along the slidewire resistance 113 as required to derive a potential between conductors 32 and 33, when no signal is impressed on the input circuits of valves 106 and 107, of the proper magnitude to create that potential drop across resistance 6 which is required to balance the thermocouple electromotive force whereby the elements 13, 14, 15, 16, 17, 18, 24 and 25 may be dispensed with. In such modification, the conductor 32 from the reconverter may be connected through resistances 6 and 20 and instruments 22 and 23 to the conductor 33. The application of a signal of one phase or of opposite to the input circuits of valves 106 and 107 in response to potentiometer unbalance in one direction or the other will operate to vary the current flow from the reconverter as required to rebalance the potentiometer.

Figure 7:
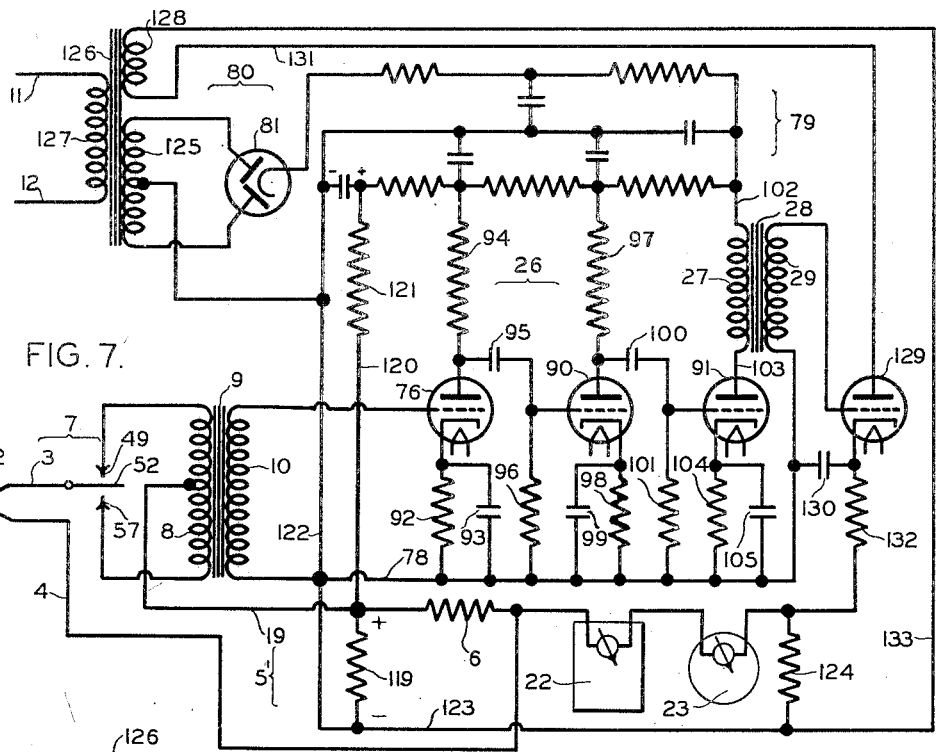

In Fig. 7 I have illustrated more or less diagrammatically a modification of the measuring system disclosed in Figs. 1–6 in which the rectifier 13 and the resistance 14 and condenser 15 have been dispensed with and the direct current potential derived by means of those elements is obtained from the full wave rectifier 80 which supplies the direct current plate voltages for the electronic amplifier 26. Fig. 7, in addition, illustrates in detail one form of filter 79 which may be utilized in the electronic amplifier 26 and shown only schematically in Fig. 5. Fig. 7 also illustrates a different form of reconverter which may be utilized in lieu of the reconverter 30 of the arrangement of Fig. 1.

Specifically, the thermocouple circuit in Fig. 7 may be traced from one terminal of the thermocouple 2, through conductor 4, to the resistance 6, to conductor 19, and to the mid-point of the transformer primary winding 8 the opposite ends of which are adapted to be alternately connected to the other terminal of the thermocouple by means of the interrupter or converter 7 and the conductor 3. The electromotive force produced by thermocouple 2 is opposed to the potential drop produced across the resistance 6 partly by a flow of direct current derived from the full wave rectifier 80 through the filter 79 and partly by the flow of direct current derived from the reconverter. The circuit from which the first mentioned direct current is derived may be traced from the positive terminal of the filter 79 through a conductor 120 in which a resistance 121 is inserted, through resistance 119, and through a conductor 122 to the negative terminal of the filter. It will be noted that this flow of direct current from the rectifier 80 and filter 79 operates to render the upper end of resistance 119, as seen in the drawing, positive with respect to the lower end of the resistance. The circuit from which the second mentioned direct current is derived includes a resistance 124 through which current from the reconverter is passed. The direction of such current flow through resistance 124 is such as to render the upper terminal of the latter positive.

The upper ends of the resistances 119 and 124 are connected to each other through resistance 6 and instruments 22 and 23 and the lower ends of resistances 119 and 124 are connected by a conductor 123. Since the upper ends of both of the resistances 119 and 124 are positive, a current will flow through resistance 6, and instruments 22 and 23 in one direction or the other depending upon whether the potential drop across resistance 124 is greater or less than that across resistance 119. The electromotive force generated by thermocouple 2 is opposed to the potential drop produced across resistance 6 by such current flow therethrough in a potentiometer circuit which has been indicated generally by the reference character 5'. When the potential drop across resistance 6 is equal to the thermocouple electromotive force, the potentiometer will be precisely balanced.

The rectifier 80 comprises an electronic valve 81 which is a full wave rectifier valve and has its two anodes connected to opposite terminals of the secondary winding 125 of a transformer 126. The transformer 126 also includes a line voltage primary winding 127 and a high voltage secondary winding 128. The rectifier valve 81 may be of the type in which the heater filament comprises the cathode or may be of the type in which an indirectly heated cathode is provided. It will be apparent that the rectifier valve 81 may also be of the indirectly heated cathode type, if desired.

The filter 79 includes resistance and capacitive components which are cooperatively related to each other so as to smooth out the ripple in the direct current output of the rectifier valve 81. As shown, more stages of filtering may be provided for producing the direct current potential drop across the resistor 119 than are provided for energizing the anode circuits of the electronic amplifier 26 in order to insure the establishment of a smooth direct current potential free from ripple across the resistance 119.

The electronic amplifier 26 of Fig. 7 may be identical to the electronic amplifier 26 shown in Fig. 5. The output circuit of the electronic valve 91 is connected through conductors 102 and 103 to the terminals of the primary winding 27 of the transformer 28 which also includes the secondary winding 29. The terminals of the transformer secondary winding 29 are connected to the input circuit of a single electronic valve 129 which is utilized in the Fig. 7 arrangement in lieu of the two electronic valves 106 and 107 employed in the reconverter 30 of Fig. 6.

The electronic valve 129 is a heater type triode having an anode, a cathode and a control electrode. The filament heater of the electronic valve 129 may be energized from the same source of alternating current which supplies energizing current to the heater filaments of the electronic valves 76, 90 and 91 or, if desired, a separate source of alternating current may be provided for energizing the heater filament of the valve 129. The input circuit of the electronic valve 129 may be traced from the cathode thereof through the resistances 132 and 124 to the conductors 123 and 78 to the lower terminal of the transformer secondary winding 29 and through the latter to the control electrode of valve 129. The resistors 132 and 124 operate as cathode biasing resistors and tend to place a negative bias on the control electrode. The anode circuit of the valve 129 may be traced from the lower terminal of the transformer secondary winding 128 through a conductor 131 to the anode of valve 129, the cathode, resistance 132, resistance 124 which is shunted by resistances 6 and 119 and meters 22 and 23 and conductor 133 to the upper terminal of the transformer secondary winding 128. A condenser 130 connected between the cathode and the lower terminal of the transformer secondary winding 129 is provided for smoothing out the ripple in the valve output current.

When the resultant of the potential drop produced across the resistance 6 and the electromotive force of the thermocouple 2 is zero, no alternating voltage will be induced in the transformer secondary winding 29 and in this condition of operation the electronic valve 129 will conduct a predetermined amount of current depending upon the self biasing action of the resistors 132 and 124 on the control electrode. The biasing resistors may desirably be so adjusted that the current conducted with no impressed signal is intermediate its normal range of variation.

Upon unbalance in the potentiometric network 5' produced by a change in electromotive force generated by the thermocouple 2, the resultant of the potential drop produced across the resistances 6 and the thermocouple potential will be translated by the interrupter 7 and the transformer 9 into an alternating voltage across the terminals of the transformer secondary winding 10. This alternating voltage will be amplified by the electronic amplifier 26 into an alternating voltage of corresponding voltage but of increased magnitude across the terminals of the transformer secondary winding 29. The alternating voltage so induced in the transformer secondary winding 29 is applied to the input circuit of the electronic valve 129 and operates to alternately oppose and assist the negative bias maintained on the control electrode by the biasing resistors 132 and 124.

When the direction of potentiometric unbalance is such as to cause the alternating voltage applied to the control electrode of valve 129 to oppose the negative bias maintained on the control electrode by the cathode biasing resistors during the half cycle of the alternating voltage supply when the anode of valve 129 is positive, the conductivity of the electronic valve 129 will be increased to an extent depending upon the magnitude of the alternating voltage induced in the winding 29. The flow of anode current through the resistance 124 from the valve 129 operates to produce a potential drop across this resistance which is in the proper direction to reduce the unbalanced electromotive forces in the potentiometric network 5'. The unbalanced potentiometric electromotive forces in the potentiometric network 5' will not be exactly reduced to zero since some slight unbalance is required to maintain the increased current flow from the electronic valve 129 required to be delivered to the resistance 124 for rebalancing the potentiometer. The extent to which the potentiometric network 5' must be unbalanced for this purpose is extremely slight, however, and therefore, the potentiometric network 5' for all practical purposes may be regarded as being exactly balanced. The resultant flow of current through the instruments 22 and 23 and the resistance 6 for this new value of potential drop across resistance 124 will operate to provide a measure of the extent to which the thermocouple electromotive has changed and thereby to provide a measure of the temperature to which the thermocouple 2 is subjected. It is noted that current flow through resistance 6 and instruments 22 and 23 may either increase or decrease upon such change in potential drop across resistance 124 depending upon whether the potential drop across resistance 124 originally was greater or less than the potential drop across resistance 119.

Upon unbalance of the potentiometric network 5' in the opposite direction, an alternating voltage of opposite phase will be induced in the transformer secondary winding 29. This alternating voltage will operate to increase the negative bias on the control electrode of valve 129 during the half cycle when the latter is conductive, and therefore, to effect a reduction in the anode current flow from the valve 129 through the resistance 124. The resulting decrease in potential drop across resistance 124 will operate to effect a change in the current flow through resistance 6 of the proper amount to restore the state of balance of the potentiometric network 5'. The meters 22 and 23 provide an indication of the change in the current flow through resistance 6 and thereby provide a measure of the temperature to which the thermocouple 2 is subjected.

Figure 8:
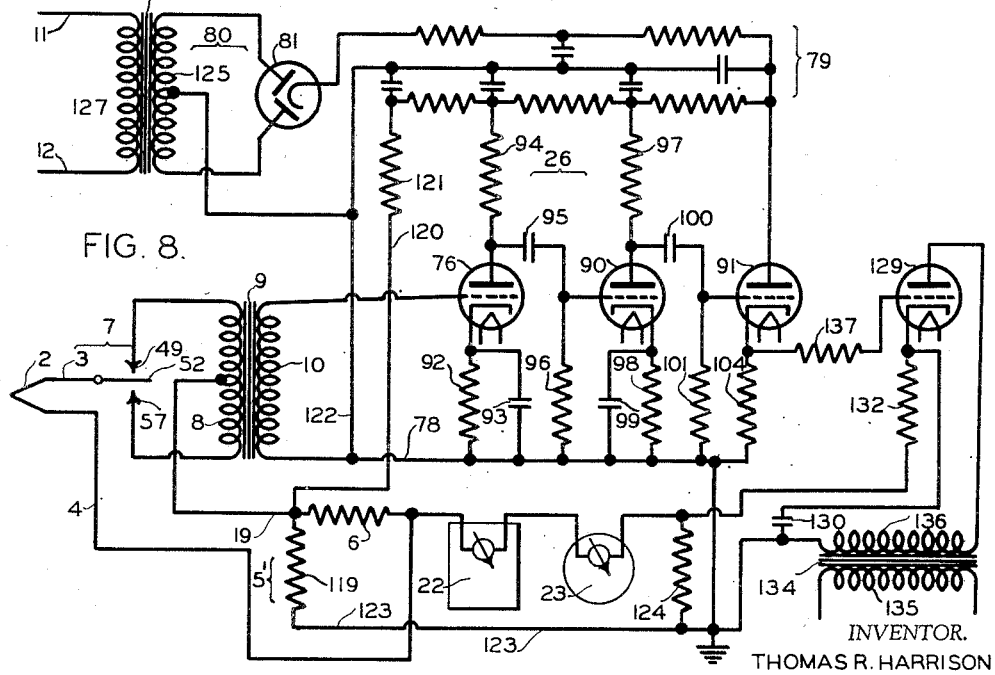

In Fig. 8 I have illustrated a modification of the arrangement disclosed in Fig. 7 in which the transformer 28 of Fig. 7 has been dispensed with and in which the reconverter tube 129 is controlled by direct electrically conductive connections to the resistance 104 of amplifier 26. In addition, Fig. 8 discloses the use of a separate transformer 134 having a line voltage primary winding 135 and a secondary winding 136 for energizing the output circuit of the valve 129 but it will be understood that, if desired, a winding 128 may be provided on the transformer 126 for this purpose as in the Fig. 7 arrangement.

In Fig. 8 a negative bias is normally maintained on the control electrode of valve 129 which is the resultant the potential drops across resistors 132, 124 and 104. The potential drop across resistance 104 is opposed to the potential drops across resistances 132 and 124. A condenser 130 is also provided for smoothing out the ripple in the valve output current so as to cause that current to be substantially smooth and steady. The input circuit of the valve 129 may be traced from the cathode through the biasing resistors 132 and 124 to the conductor 78, resistor 104 and a current limiting resistor 137 to the control electrode of valve 129. In Fig. 8 the resistor 104 of the amplifier 26 is not shunted by a condenser although a condenser may be connected in shunt to this resistor if so desired. The operation of the arrangement of Fig. 8 in other respects is identical to that of Fig. 7 and therefore further explaination is not believed necessary.

Figure 9:
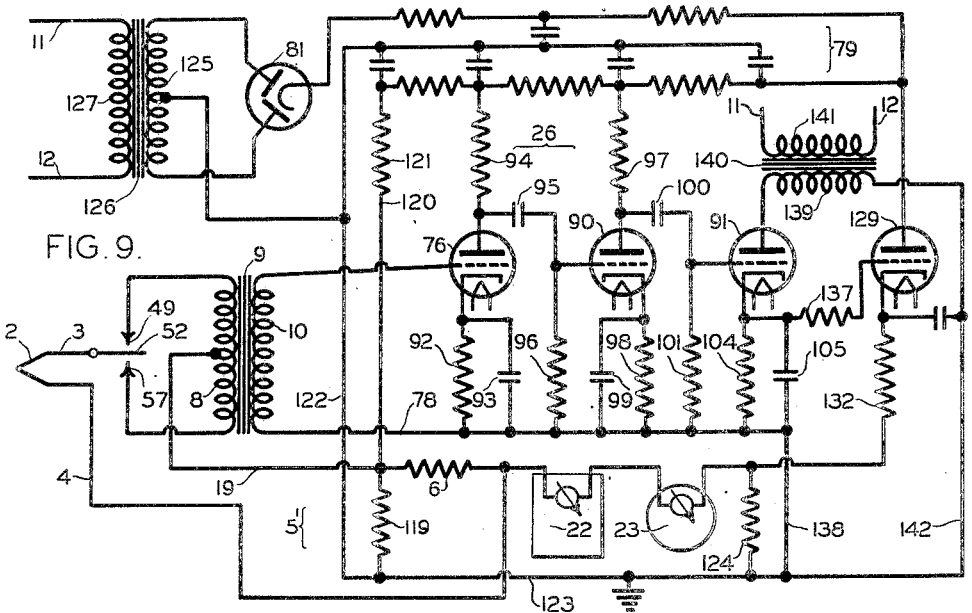

In Fig. 9 I have illustrated, more or less diagrammatically, another modification of the measuring system shown in Fig. 7 in which the output stage of the amplifier 26 is energized with alternating current instead of direct current and in which the reconverter is of the type shown in Fig. 7 but instead of being energized with alternating current it is energized with direct current. Reconverter valve 129 in Fig. 9 is supplied with anode voltage through a circuit which may be traced from the positive terminal of the filter 79 to the anode of valve 129, the cathode thereof, cathode biasing resistances 132 and 124, the latter of which is shunted by resistances 6 and 119 and meters 22 and 23, and through conductor 122 to the negative terminal of the filter. The input circuit of the valve 129 may be traced from the cathode through resistances 132 and 124 and the shunt circuit of the latter, a conductor 138, resistance 104 shunted by condenser 105, and resistance 137 to the control electrode. A negative bias potential is applied to the control electrode of valve 129 by the biasing resistors 132 and 124, but this biasing potential is adapted to be reduced in magnitude by the potential drop produced across the resistance 104 by the flow of current from the electronic valve 91 therethrough.

The output circuit of the electronic valve 91 receives energizing current from the secondary winding 139 of a transformer 140 having a line voltage primary winding 141. The output circuit of valve 91 may be traced from the left end terminal of the winding 139 to the anode of valve 91, the cathode thereof, the biasing resistance 104 and condenser 105 connected in shunt therewith, conductor 138, and a conductor 142 to the right end terminal of the winding 139. The input circuit of the valve 91 is controlled by the output circuit of the valve 90 to which it is resistance-capacity coupled by condenser 100 and resistance 101.

When the potentiometric network 5' is exactly balanced, no alternating voltage is induced in the secondary winding 10 of the transformer 9 and under this condition the current conducted by the electronic valve 91 is maintained at a predetermined value, preferably intermediate its normal range of variation, by virtue of the action of the cathode biasing resistance 104 and the condenser 105 which are properly chosen to attain this end. Accordingly, the potential drop across the resistance 104 and condenser 105 will then be a predetermined value. The potential impressed on the control electrode of the valve 129 will then be negative by the proper amount to maintain the current conducted by valve 129 intermediate its normal range of variation.

Upon unbalance of the potentiometric network 5', the alternating electromotive force induced in the transformer secondary winding 10 will be amplified by the electronic valves 76 and 90 and applied to the input circuit of the valve 91. When this alternating electromotive force is of the proper phase to drive the control electrode of valve 91 less negative during the half cycles of the alternating voltage supplied by the transformer secondary winding 139 when the anode of valve 91 is positive, the conductivity of the valve 91 will be increased with the result that the potential drop across the resistance 104 and condenser 105 will be correspondingly increased. The increased potential drop across resistance 104 and condenser 105 will operate to reduce the negative bias on the control electrode of valve 129 and accordingly increase the conductivity of the valve 129. The extent to which the conductivity of valve 129 is increased is dependent upon the increase in potential drop across the resistance 104 and condenser 105 and thereby by upon the extent to which the potentiometric network 5' has been unbalanced.

The change in the output current from the electronic valve 129 produces a change in the potential drop across the resistance 6 in the propper direction to rebalance the potentiometric network 5'. The magnitude of the current through the resistance 6 required to rebalance the potentiometric network 5' is indicated by the meters 22 and 23 and thus provides a measure of the temperature to which the thermocouple 2 is subjected.

In Fig. 10 I have illustrated a modification of the arrangement shown in Fig. 9 wherein the transformer 140 for energizing the anode circuit of the electronic valve 91 has been dispensed with and alternating current for this purpose is obtained by means of a winding 128 provided on the transformer 126. Fig. 10 also distinguishes from the arrangement disclosed in Fig. 9 in that the resistances 119 and 124 have been dispensed with whereby the electromotive force developed by the thermocouple 2 is opposed only to the electromotive force produced across resistance 6 by the flow of output current from the electronic valve 129. The circuit through which those electromotive forces are opposed has been indicated generally by the reference numeral 5'' and also comprises a potentiometric measuring network. This modification further distinguishes from the preceding arrangements in that it is contemplated to unbalance the potentiometric network 5'' in one direction only. In other words the potentiometric network 5'' will be precisely balanced only when the electromotive force produced by thermocouple is a maximum value and the output current from valve 129 is also a maximum value.

The current flow from the thermocouple 2 through the resistance 6 may be traced from the lower terminal of the thermocouple 2 through conductor 4 to resistor 6, the transformer primary winding 8, interrupter 7, and conductor 3 to the upper terminal of the thermocouple. The output circuit of the reconverter valve 129 may be traced from the positive terminal of the filter 79 to the anode circuit of the valve 129, through indicator 23, recorder 22, resistor 6 and conductor 122 to the negative terminal of the filter. The thermocouple 2 is so connected to the circuit that its electromotive force is opposed to the potential drop produced across the resistance 6 by the flow of current from the reconverter 129.

The input circuit of the electronic valve 129 is controlled in accordance with the potential drop produced across a resistance 143 which is shunted by a condenser 144 and is connected in the output circuit of the valve 91. The resistance 143 and condenser 144 are connected between the control electrode and the cathode of the valve 129.

With this arrangement, when the potentiometric network 5" is in a balanced condition, the conductivity of electronic valve 91 will be at its lowest value by virtue of the action of the cathode biasing resistance 104' and a condenser 105' which are chosen as to give this result, and consequently, the difference in potential between cathode and control electrode of the valve 129 will be at a minimum. Accordingly, the valve 129 will be fully conductive. The potential drop produced across the resistance 6 by the flow of output current from the valve 129 will then exactly balance the maximum electromotive force produced by thermocouple 2.

Upon unbalance of the potentiometric network following a reduction in the thermocouple electromotive force, an alternating voltage will be applied to the input circuit of the electronic valve 91. This alternating voltage will be of the proper polarity to render the control electrode of valve 91 less negative during the half cycles that its anode is positive. The conductivity of the electronic valve 91 will then be increased whereby a potential drop will be produced across the resistance 143 in the proper direction to drive the control electrode of valve 129 negative with respect to the potential of its cathode. The conductivity of the valve 129 will then be decreased with the result that a corresponding decrease in the potential drop across resistance 6 by the flow of output current from the tube 129 will be effected. This is in the proper direction to rebalance the potentiometric network 5", and such rebalance will be effected to a high degree of precision notwithstanding the fact that some slight unbalance is required to maintain the output current from the valve 129 at this decreased value. The flow of current from the valve 129 through the indicator 23 and recorder 22 provide a measure of the temperature to which the thermocouple 2 is subjected.

In Fig. 11 I have illustrated, more or less diagrammatically, another modification of the arrangement of Fig. 7 wherein a reconverter having a pair of output tubes 145 and 146, which are energized in opposite phase, is provided to give full wave excitation to the resistance 124 connected in the cathode return circuit of the output tubes. Tubes 145 and 146 are heater type triode and include anode, cathode, control electrode and heater filament elements. In this modification, as well as in the arrangement of Fig. 7, a potential drop of predetermined magnitude is produced across the resistor 119 by a direct current flow derived from the rectifier 80. The conductors 4 and 10 leading from the thermocouple 2 and the interrupter 7 are connected across the terminals of the resistor 6. The resistors 6, 119, and 124 are connected in a series circuit in which a recorder 22 is also connected for recording the variations of temperature to which the thermocouple 2 is subjected. If desired, an indicator 23 may also be connected in this series circuit.

The output circuits of the electronic valves 145 and 146 receive energizing current from the transformer secondary winding 125, which transformer secondary winding also supplies energizing current to the full wave rectifier valve 81. Specifically, one end terminal of the winding 125 is connected to the anode or valve 145 and the other end terminal of the winding 125 is connected to the anode of valve 146. The cathodes of the valves 145 and 146 are connected together and are connected through a resistance 147 and the resistance 124 to a point intermediate the ends of the winding 125.

The input circuits of the valves 145 and 146 are arranged to be controlled by the output stage of the electronic amplifier 26. Thus, the output circuit of the electronic valve 91 of amplifier 26 is connected to the primary winding 148 of a transformer 149 having a center tapped secondary winding 150. One end of the winding 150 is connected to the control electrode of valve 145 and the other end of the winding is connected to the control electrode of valve 146. The center tap of the winding 150 is connected through the resistances 124 and 147 to the cathodes of the valves 145 and 146.

With this arrangement, when the potentiometric network 5' is balanced, no alternating voltage is induced in the secondary winding 150 and under this condition the potentials of the control electrodes of valves 145 and 146 are maintained equal to each other and somewhat negative with respect to the potentials of their associated cathodes by virtue of the action of resistances 124 and 147. The flow of cathode current from the valves 145 and 146 through the resistances 124 and 147 produce a potential drop across these resistances in the direction to tend to apply a negative bias to the control electrodes of the valves. The potential drop produced across the resistance 124 during this condition of operation is precisely that value required to effect a balance between the potential drop across the resistance 6 and the thermocouple electromotive force.

Upon unbalance of the potentiometric network 5' in one direction, an alternating voltage will be induced in the transformer winding 150 of the proper phase to cause the control electrode of valve 145 to become less negative during the half cycle of the voltage supply when the anode of the valve 145 is positive, and thus operates to increase the conductivity of valve 145. During this half cycle the control electrode of valve 146 will be driven more negative during the half cycle when the anode of that valve is also negative and the valve is non-conductive. During the next half cycle of the alternating voltage supply the potential of the control electrode of valve 145 will be rendered more negative but during this half cycle valve 145 will be non-conductive since the anode is then negative. In this half cycle the valve 146 will be conductive and the potential of the control electrode of valve 146 will be driven less negative. Consequently, the conductivity of the valve 146 will then be increased while the valve 145 is non-conductive. Since the resistance 124 is connected in the common return circuit of the two valves 145 and 146 an increase in the potential drop across the resistance 124 will be produced inasmuch as the half wave pulses of current from the valves 145 and 146 during alternate half cycles are increased.

Upon unbalancing of the potentiometric network 5' in the opposite direction, the alternating voltage produced in the transformer secondary winding 150 is of the proper phase to render the control electrodes of valves 145 and 146 more negative during the alternate half cycle when these valves are conductive. Accordingly, the pulses of output current from the valves 145 and 146 are decreased whereby a corresponding decrease in potential drop across resistance 124 is effected. This decrease in potential drop across resistance 124 is of the proper amount to effect rebalance of the potentiometric network 5'.

In Fig. 12 I have illustrated a still further modification of the arrangement of Fig. 1 wherein suitable provisions are made for maintaining the temperature within the furnace 1 constant to a high degree of accuracy notwithstanding variations in the load within the furnace or changes in the heating value of the fuel supplied for heating the furnace. It is known in the art that on a change in an operating condition such, for example, as a change in the furnace load or on a change in the B. t. u. content of the fuel supplied to the furnace, the furnace temperature will tend to vary but due to the furnace heat inertia the change in the operating condition will exist for some time before it results in a temperature change which may be detected by the apparatus employed to maintain the furnace temperature at the desired value. When thereafter a correction in the amount of fuel supplied to the furnace is made to restore the furnace temperature to its desired value, such correction is not effective to immediately restore the desired condition. This lag is also due to the heat inertia of the furnace. In addition, if a sufficiently large corrective adjustment is made to restore the furnace temperature to the desired value within a relatively short time, and is maintained until the desired value is reached, the furnace temperature will tend to overshoot that value and subsequent corrective adjustments will result in oscillation of the furnace temperature about the desired value.

Suitable control provisions, now to be described, are provided in the arrangement of Fig. 12 to prevent such hunting or oscillating and to effect control or regulation of the furnace temperature at an even given value.

As illustrated in Fig. 12 the supply of fuel to the furnace 1 is regulated by the adjustment of a fuel valve 151 in automatic response to variations in the furnace temperature as required to maintain that temperature approximately constant. The furnace temperature is measured by means of the thermocouple 2 and a measuring system which may be of the type disclosed in Fig. 1 and described in connection with that figure. The measuring system of Fig. 12 differs from that shown in Fig. 1 only in that a fixed resistance 152 is connected in circuit with the recorder 22 and indicator 23. Current flows through the resistance 152 from the resistance 14, from the reconverter 30 and from a control network to be described. In the normal operation of the apparatus with the temperature of furnace 1 at the desired value the total current through resistance 152 is a predetermined value and upon change in the furnace temperature from the desired value the change in current flow through resistance 152 which tends to be produced as a result of the reconverter 30 diverting current from the resistance 6 or supplementing the current flow through the latter is at least partially compensated temporarily by a change in the current flow to the resistance 152 from the control network referred to. The manner in which this effect is accomplished and the operation when the initial corrective adjustment of the fuel valve 151 is insufficient to restore the furnace temperature to the desired value is explained hereinafter.

The initial effect of any change in the potential drop across resistance 152 is to produce a change in potential applied to an electrical control network 153 and thereby to vary the energization of a solenoid 154 as required to effect a corrective adjustment of the fuel valve 151 and also to effect a corresponding network neutralizing or follow-up adjustment of the potential drop across the resistance 152 to restore that potential to its original value. The electrical network 153 includes condensers 155, 156 and 156' and resistances 155a and 156a. The components 155 and 155a are connected in parallel as are also the components 156 and 156a. These parallel circuits are connected in series with each other and with condenser 156' between the terminals of resistance 152.

Changes in the potential applied to the electrical control network 153 are arranged to be detected by a pair of electrical valves 157 and 158. Valve 157 is a heater type triode and includes anode, cathode, control electrode and heater filament elements. Valve 158 may also be of the same type. The input circuit of valve 157 may be traced from the cathode to a battery 159 and the parallel connected condenser 155 and the resistance 155a to the control electrode. The input circuit of the valve 158 may be traced from the cathode to a battery 160, an adjustable contact 161 for tapping off a desired portion of the voltage of the battery 160, a conductor 162, battery 159 and conductor 163, resistance 152 and a conductor 164 to the control electrode.

The output circuit of the valve 157 is energized by a battery 165 through a circuit which may be traced from the positive terminals of the battery to the anode of valve 157, the cathode, battery 159, conductor 163, resistance 152, and conductor 164 to the negative terminal of the battery. It is the flow of output current from valve 157 through resistance 152 which is utilized in this form of my invention to at least partially compensate temporarily for any change in current flow through the resistance 152. The output circuit of the valve 158 is energized by a battery 160 through a circuit which may be traced from the positive terminal of the battery through a conductor 166, in which the solenoid 154 is connected, to the anode of valve 158, and the cathode of the valve to the negative terminal of the battery 160.

Battery 159 which is connected in the input circuit of the valve 157 tends to maintain a potential on the control electrode thereof which is negative with respect to the potential of the cathode, and similarly the portion of the battery 160 which is tapped off by the contact 161 tends to maintain a positive potential on the control electrode of the valve 158 relatively to the potential of its associated cathode.

When the furnace temperature has been stabilized at the desired value for an appreciable period of time, the potential drop across the resistance 152 will be at a steady predetermined value depending upon the adjustment of the contact 16 along the slidewire resistance 14, and under this condition the potential of the control electrode of valve 157 will be that maintained thereon by the battery 159 alone. This is the case because of the action of resistance 155a in operating after a period of time to discharge from condenser 155 any charge that may previously have existed thereon. The potential maintained on the control electrode of valve 158 will then be that maintained thereon by the resultant of the portion of battery 160 tapped off, battery 159 and the potential drop across resistance 152.

The initial effect of any change in the furnace temperature will be to produce a change in the state of balance of the potentiometric network 5 and thereby to cause a change in the flow of current from the output circuit of the reconverter 30 through the circuit including resistor 152 for effecting a rebalancing adjustment of the potentiometric network. The resulting change in potential drop produced across the resistance 152 operates to change the potential on the control electrode of valve 158 and also simultaneously operates to change the potential on the control electrode of valve 157. The change in potential across resistance 152 is effective immediately to cause a change in the conductivity of valve 158 and thereby to change the energization of solenoid 154. The sense of this change in the energization of solenoid 154 is that required to effect a corrective adjustment of valve 151 in the direction to restore the furnace temperature to the desired value.

Due to the action of the parallel connected condenser 156 and resistance 156a, however, the change in potential across resistance 152 is not effective immediately to cause a complete change in the potential of the control electrode of valve 157 relatively to the potential of the cathode. The condenser 156 and resistance 156a operate to temporarily delay the application of the full change in the potenital across resistance 152 to the control electrode of valve 157 and thereby operate to temporarily delay the full compensating action of change in the output current from valve 157 upon the current flow through resistance 152. As is explained hereinafter this temporary delay operates to introduce an initial magnetification in the adjustment of valve 151 and is desirably of a duration proportioned to the overall characteristics of the furnace 1, the load therein and the fuel utilized whereby the initial magnified adjustment of valve 151 tends to effect quick restoration of the furnace temperature to the desired value. Such proportion can be obtained by properly choosing condenser 156 and resistance 156a in relation to the values of the other circuit components.

The temporary delay in transferring a maximum potential change across resistance 152 to the control electrode of valve 157 introduced by condenser 156 and resistance 156a is obtained by virtue of a transient effect introduced by the latter elements, which transient effect tends to minimize the change in the potential of the control electrode of valve 157 in response to a given change in potential across resistance 152. As this transient effect gradually dies out, the potential change applied to the control electrode of valve 157 gradually approaches a condition of proportionality with the change in potential across resistance 152 and, therefore, the output current flow from valve 157 undergoes a change as required to compensate at least partially for the change in potential across resistance 152.

More specifically, immediately upon change in the furnace temperature from the desired value and a consequent change in potential drop across resistance 152, the potential across condenser 155 changes an amount depending upon the capacity of condenser 155 in relation to the capacities of condensers 156 and 156'. This change in potential on condenser 155 is applied to the input circuit of valve 157 and operates to cause a corresponding change in output current from valve 157. This change in output current is in the direction to compensate for the change in current flow through resistance 152 but is of such small magnitude as to only partly compensate therefor.

As that part of the potential change across resistance 152 which has been assumed by condenser 156 dies out as a result of being dissipated through resistance 156a, the potential applied to the control electrode of valve 157 is further increased in the same direction, and accordingly, an additional change in the output current of valve 157 is produced to further and more completely compensate for the change in current flow through resistance 152.

These partial and then more complete compensating operations together comprise a so-called follow-up or neutralizing action. It is noted the current flow through resistance 152 will not be restored precisely to its original value, but will be somewhat less than its original value because a slightly different potential on the control electrode of valve 157 is required to maintain the new output current from valve 157. The extent to which the potential drop across resistance 152 must be displaced for this purpose is very slight since the valve 157 has a narrow operating range, that is, only a small change in potential of the control electrode is required to vary the output current throughout its entire range of variation. The valve 158 also desirably has a similar narrow operating range. The effect of this follow-up or neutralizing action is to tend to restore the potential of the control electrode of valve 158 to its original value and thereby to tend to restore the valve 151 to its original position, but since the potential drop across resistance 152 is some different value after the follow-up action, the fuel valve adjustment will be correspondingly different.

Such follow-up or neutralizing action is not permanent in effect as long as the furnace temperature is displaced from the desired value, or control point, by virtue of the operation of condenser 155 and resistance 155a. That is, so long as the furnace temperature is displaced from the desired value, such follow-up action as is produced by the valve 157 is transient or discontinuous in its effect and will gradually diminish as the condenser 155 discharges through the resistance 155a. Such discharging of the condenser 155 operates to restore the potential of the control electrode of valve 157 to its original value, namely that maintained thereon by the battery 159, and therefore, the compensating change in output current from valve 157 through resistance 152 is gradually diminished as the condenser 155 discharges. The result of this operation is that the potential of the control electrode of valve 158 is gradually changed in the same direction as the original change in potential thereof, and consequently, additional fuel valve adjustment will be made in a corresponding manner. Since the charging and discharging of condenser 155 through resistance 155a is gradual, such additional adjustments of valve 151 will also be gradual.

Such additional opening adjustments of the valve 151 will be continuously and gradually effected as long as the furnace temperature is displaced from the desired value and moreover, will be effected at a rate corresponding to the character of the operation being controlled. Such additional fuel valve adjustments are known to those skilled in the art as compensating or resetting adjustment and are effective to prevent stabilization of the furnace temperature at a value displaced from the desired control point and consequently are effective to return the furnace temperature to the desired value. The rate of those adjustments may be varied, as desired, by adjustment of the value of resistance 155a by knob 167, and accordingly, the apparatus of the present invention may be suited to the characteristics of the operation that is to be controlled.

On a decrease in the furnace temperature and a consequent reduction in the potential drop across the resistance 152 followed by a prolonged period in which there is a tendency for no further temperature change, the potential drop across resistance 152 will be reduced, and therefore, the potential applied to the control network 153 by conductors 163 and 164 will be reduced. This immediately effects a reduction in the negative potential applied to the control electrode of valve 158 and thereby an increase in the energizing current to the solenoid 154, which increase in current, in turn, effects an opening adjustment of the valve 151. Simultaneously the negative potential on the control electrode of valve 157 is reduced and as a result the supply of current from valve 157 to resistance 152 is increased. This increase in current to the resistance 152 tends to compensate for the change in potential drop thereacross caused by the furnace temperature change. Due, however, to a transient potential drop produced across the parallel connected condenser 156 and resistance 156a, the compensating change in output current from valve 157 through resistance 152 will be smaller than it would be if the condenser 156 and resistance 156a were omitted. After a predetermined interval the condenser 156 will be completely discharged through the resistance 156a and thereby the potential across these elements will be reduced to zero. That potential is not simply dissipated, however, but will gradually appear across condenser 156' and the parallel connected condenser 155 and resistance 155a, dividing in accordance with the relative capacities of the condensers 155 and 156'.

In this manner the potential of the control electrode of valve 157 is further reduced and as a result an additional change in the output current from the valve 157 through resistance 152 will be made. The effect of such additional neutralizing or follow-up action is to further restore the potential drop across resistance 152 to its original value and consequently to effect an increase in the negative potential applied to the control electrode of valve 158. This operates to effect a decrease in the energization of solenoid 154, and hence, a closing adjustment of the valve 151. The condenser 156 and resistance 156a are desirably so proportioned in relation to the other circuit components that the initial fuel valve opening adjustments are made during the beginning of the furnace temperature cycle of variation. The magnitude of the initial valve opening adjustment may be varied by adjusting the value of resistance 156a, for example by manipulation of knob 156b.

Thus it will be noted that on a furnace temperature change, followed by a prolonged period during which no further change in temperature takes place, an initially large opening adjustment of the fuel valve 151 will be made which is followed at the end of a suitable interval by a reduction in that valve opening adjustment, and thereafter, resetting adjustments of the valve 151 will be effected in the manner described until the furnace temperature has returned to the desired value thus overcoming any tendency for stabilization below the control point.

While the condition considered in the foregoing explanation has been that wherein the furnace temperature has dropped to a value below the control point and then tends to be stabilized at that lower value, it will be apparent that in actual operation, the variations in furnace temperature will be gradual. Under this condition the current flow through resistance 152 will tend to gradually decrease in value for the case when the temperature is falling and there will be a tendency for the initial magnification in the adjustment of valve 151 to build up to its maximum value. Such tendency is counteracted by the discharging of condenser 156 through resistance 156a, and therefore, the magnification will assume some intermediate value depending upon the rate of current decrease in resistance 152. The magnification of the adjustment of the fuel valve 151 will thus vary in proportion to the rate of change of current flow through resistance 152 and will be larger when that rate of current change is larger since the potential on condenser 156 will discharge to a greater extent on slow rates of such current change than on rapid rates of change.

The effective magnification in the adjustment of the fuel valve 151 is thus seen to be one which may be expressed mathematically in terms of rate of change since the magnitude of the magnification obtained is proportional to the rate of change in the condition being controlled.

While the control provisions of Fig. 12 have been illustrated in connection with the measuring arrangement of Fig. 1, it will be understood that these control provisions may also be adapted with equal facility with the measuring arrangements of Figs. 7–11.

In Fig. 13 I have illustrated a modification of the control provisions of Fig. 12 wherein the fuel valve adjustments are effected by a rotating type reversible electrical motor 169 having a pair of windings 170 and 171 which are adapted to be selectively energized to produce opening and closing adjustments of the fuel valve 151. The selective energization of the motor windings 170 and 171 is controlled in accordance with the deflections of a movable contact 172 of a differential relay 173. The relay 173 includes a pair of coils 174 and 175 and also a pair of armatures 176 and 177 which extend into the relay coils 174 and 175, respectively. The movable contact 172 is carried by a lever 178 which is pivoted at a point 179 and carries the armatures 176 and 177. The armatures 176 and 177 are connected to the lever 178 at points on opposite sides of the pivot 179 so that when one or the other of the coils 174 and 175 is energized to a greater extent than the other, the lever 178 is rotated around its pivot point to thereby effect movement of the contact 172 into engagement with one or the other of a pair of contacts 180 or 181. When both of the coils are equally energized, the lever 178 is adjusted to a position wherein the contact 172 is intermediate the contacts 180 and 181. The relay coil 174 is connected in the output circuit of the electronic valve 158 and the other relay coil is connected through an adjustable resistance 182 to the alternating current supply conductors L¹ and L². The movable contact 172 is connected by a conductor 183 to the alternating supply conductor L² and the contacts 180 and 181 are connected to a respective terminal of the motor windings 170 and 171. The other ends of the motor windings are connected to the supply line L¹. Thus, for example, on an increase in the energizing current through the relay 174 and a consequent deflection of the contact 172 with the contact 181, the motor will be energized for rotation in the direction to effect an opening adjustment of the fuel valve 2. Thereafter, the resistance 182 will be adjusted by the motor 169 to decrease the resistance in circuit with the relay winding 175 and thereby increase the energization of winding 175.

Subject matter disclosed in this application and not claimed therein is disclosed and is being claimed in application Serial No. 301,174 filed by Harry S. Jones on October 25, 1939, for Control apparatus, issued into Patent 2,282,726 on May 12, 1942.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. Self balancing apparatus for measuring the magnitude of a unidirectional potential in a low resistance circuit including a unidirectional potential of relatively fixed magnitude, a unidirectional potential of variable magnitude, means to oppose said second and third mentioned potentials to derive a differential potential, means to oppose said differential potential to said first mentioned potential to derive a second differential potential, and physically stationary means controlled by said second differential potential to regulate the magnitude of said third mentioned potential to reduce the magnitude of said second mentioned differential potential.

2. Self balancing apparatus for measuring the magnitude of a unidirectional potential in a low resistance circuit including a unidirectional potential of relatively fixed magnitude, a unidirectional potential of variable magnitude, means to oppose said second and third mentioned potentials to derive a differential potential, means to oppose said differential potential to said first mentioned potential to derive a second differential potential, and physically stationary means controlled directly and electrically by said second differential potential to regulate the magnitude of said third mentioned potential to reduce the magnitude of said second mentioned differential potential.

3. Self balancing apparatus for measuring the magnitude of a unidirectional potential in a low resistance circuit including a unidirectional potential of relatively fixed magnitude, a unidirectional potential of variable magnitude, a circuit to oppose said second and third mentioned potentials, a resistance so connected in said last mentioned circuit that current flows through said resistance in one direction or the other to create a potential drop thereacross of one polarity or of opposite polarity depending upon which of said two first mentioned potentials is the greater, means to oppose the potential drop across said resistance to said first mentioned unidirectional potential to derive a differential potential, and physically stationary means controlled by said differential potential to regulate the magnitude of said third mentioned potential and thereby the current flows through said resistance to reduce the magnitude of said differential potential.

4. Self balancing apparatus for measuring the magnitude of a unidirectional potential in a low resistance circuit including a unidirectional potential of relatively fixed magnitude, a unidirectional potential of variable magnitude, a circuit to oppose said second and third mentioned potentials, a resistance so connected in said last mentioned circuit that current flows through said resistance in one direction or the other to create a potential drop thereacross of one polarity or of opposite polarity depending upon which of said two first mentioned potentials is the greater, means to oppose the potential drop across said resistance to said first mentioned unidirectional potential to derive a differential potential, physically stationary means controlled by said differential potential to regulate the magnitude of said third mentioned potential and thereby the current flow through said resistance to reduce the magnitude of said differential potential, and means to measure the magnitude of the current flow through said resistance.

5. Self balancing apparatus for measuring the magnitude of a unidirectional potential in a low resistance circuit including a unidirectional potential of predetermined magnitude, a resistance, a circuit to impress said second mentioned potential on said resistance to create a current flow through the latter, means to oppose the potential drop produced across said resistance by said current flow to said first mentioned potential to derive a differential potential, and physically stationary means controlled by said differential potential to divert part of the current flow through said resistance or to supplement the current flow through said resistance as required to reduce said differential potential.

6. Self balancing apparatus for measuring the magnitude of a unidirectional potential in a low resistance circuit including a unidirectional potential of predetermined magnitude, a resistance, a circuit to impress said second mentioned potential on said resistance to create a current flow through the latter, means to oppose the potential drop produced across said resistance by said current flow to said first mentioned potential to derive a differential potential physically stationary means controlled by said differential potential to divert part of the current flow through said resistance or to supplement the current flow through said resistance as required to reduce said differential potential and means to measure the current flow through said resistance.

7. Self balancing apparatus for measuring the magnitude of a variable unidirectional potential in a low resistance circuit including a source of adjustable unidirectional potential, a resistance, a circuit to impress said adjustable potential on said resistance to create a current flow through the latter, means to oppose the potential drop produced across said resistance by said current flow to said first mentioned potential to derive a differential potential, physically stationary means controlled by said differential potential to divert part of the current flow through said resistance or to supplement the current flow through said resistance as required to reduce said differential potential, and means to adjust said adjustable unidirectional potential so that said differential potential is zero when said first mentioned potential is within its normal range of variation.

8. Self balancing apparatus for measuring the magnitude of a variable unidirectional potential in a low resistance circuit including a source of adjustable unidirectional potential, a resistance, a circuit to impress said adjustable potential on said resistance to create a current flow through the latter, means to oppose the potential drop produced across said resistance by said current flow to said first mentioned potential to derive a differential potential, physically stationary means controlled by said differential potential to divert part of the current flow through said resistance or to supplement the current flow through said resistance as required to reduce said differential potential, means to adjust said adjustable unidirectional potential so that said differential potential is zero when said first mentioned potential is within its normal range of variation, and means to measure the current flow through said resistance.

9. Self balancing apparatus for measuring the magnitude of a unidirectional potential including a unidirectional potential of predetermined magnitude, a resistance, a circuit to impress said second mentioned potential on said resistance to create a current flow through the latter, means to oppose the potential drop produced across said resistance by said current flow to said first mentioned potential to derive a differential potential, means to convert said differential potential into a fluctuating potential, means to amplify said fluctuating potential, and an electronic reconverter controlled by said amplified potential to divert part of the current flow through said resistance or to supplement the current flow through said resistance as required to reduce said differential potential.

10. The combination of claim 9 wherein said electronic reconverter includes a pair of electronic valves each of which have an input circuit and an output circuit, separate resistances connected in the output circuits of said valves, the path including one valve and its associated resistance being connected in parallel with the path including the other valve and its associated resistance, a source of current for energizing said paths, and means to apply said amplified potential to the input circuits of said valves, and wherein said second mentioned potential and said first mentioned resistance are connected in parallel with each other and this parallel connection is connected between a point on one of said parallel paths and a point on the other of said parallel paths.

11. The combination of claim 9 wherein said electronic reconverter includes a pair of electronic valves each of which have an input circuit and an output circuit, separate resistances connected in the output circuits of said valves, the path including one valve and its associated resistance being connected in parallel with the path including the other valve and its associated resistance, a source of current for energizing said paths, and means to apply said amplified potential to the input circuits of said valves, and wherein said second mentioned potential and said first mentioned resistance are connected in parallel with each other and this parallel connection is connected between a point on one of said second mentioned resistances and a point on the other of said second mentioned resistances, one of said points being adjustable.

12. Self-balancing apparatus for measuring the magnitude of a unidirectional potential including a source of adjustable unidirectional potential, a resistance, a circuit to impress said adjustable potential on said resistance to create a current flow through the latter, means to oppose the potential drop produced across said resistance by said current flow to said first mentioned potential to derive a differential potential, means to adjust said adjustable potential, means to convert said differential potential into a fluctuating potential, means to amplify said fluctuating potential, an electronic reconverter to divert part of the current flow through said resistance or to supplement the current flow through said resistance as required to reduce said differential potential, said electronic reconverter including a pair of electronic valves each of which have an input circuit and an output circuit, means to apply said amplified potential to the input circuits of said valves to control their conductivity, separate resistances connected in the output circuits of said valves, the path including one valve and its associated resistance being connected in parallel with the path of the other valve and its associated resistance, a source of current for energizing said paths, means connecting said second mentioned potential and said first mentioned resistance in parallel with each other between a point on one of said second mentioned resistances and a point on the other of said second mentioned resistances, the potential difference between said points being opposed to said second mentioned potential and one of said points being adjustable, and means to adjust said adjustable point and said adjustable potential in correspondence with each other to render the current flow through said first mentioned resistance from said points zero when said first mentioned potential is within its normal range of variation.

13. Self-balancing apparatus for measuring the magnitude of a unidirectional potential in a low resistance circuit including a unidirectional potential of relatively fixed magnitude, a unidirectional potential of variable magnitude, a circuit to oppose said second and third mentioned potentials, a resistance connected in said last mentioned circuit in series with said potentials whereby current flows through said resistance in one direction or the other to create a potential drop thereacross of one polarity or of opposite polarity depending upon which of said two first mentioned potentials is the greater, means to oppose the potential drop across said resistance to said first mentioned unidirectional potential to derive a differential potential, physically stationary means controlled by said differential potential to regulate the magnitude of said third mentioned potential and thereby the current flow through said resistance to reduce the magnitude of said differential potential, and means to measure the magnitude of the current flow through said resistance.

14. Self-balancing apparatus for measuring the magnitude of a unidirectional potential in a low resistance circuit including a unidirectional potential of relatively fixed magnitude, a unidirectional potential of variable magnitude, a circuit to oppose said second and third potentials, a resistance connected in said last mentioned circuit in series with said potentials whereby current flows through said resistance in one direction or the other to create a potential drop thereacross of one polarity or of opposite polarity depending upon which of said two first mentioned potentials is the greater, means to oppose the potential drop across said resistance to said first mentioned unidirectional potential to derive a differential potential, solely electrical means controlled by said differential potential to regulate the magnitude of said third mentioned potential and thereby the current flow through said resistance to reduce the magnitude of said differential potential, and means to measure the magnitude of the current flow through said resistance.

15. Self-balancing apparatus for measuring the magnitude of a unidirectional potential including a unidirectional potential of relatively fixed magnitude, means including electronic valve means to create a unidirectional potential of variable magnitude, a circuit to oppose said second and third potentials, a resistance connected in said circuit in series with said potentials whereby current flows through said resistance in one direction or the other to create a potential drop thereacross of one polarity or of opposite polarity depending upon which of said two first mentioned potentials is the greater, means to oppose the potential drop across said resistance to said first mentioned potential to derive a differential potential, means to convert the differential unidirectional potential into a fluctuating potential which may be readily amplified, means to amplify said fluctuating potential, means to control said electronic valve means by the amplified fluctuating potential to vary the magnitude of said third mentioned potential and thereby the current flow through said resistance to reduce the magnitude of said differential potential.

16. Self-balancing apparatus for measuring the magnitude of a unidirectional potential including a unidirectional potential of relatively fixed magnitude, a resistance, means including a single electronic valve having an input circuit and an output circuit in which said resistance is connected to create a unidirectional potential drop of variable magnitude across said resistance, a circuit to oppose said second and third potential, a second resistance connected in said circuit in series with said opposed potentials whereby current flows through said second resistance in one direction or the other to create a potential drop thereacross of one polarity or of opposite polarity depending upon which of said second and third mentioned potentials is the greater, means to oppose the potential drop across said second resistance to said first mentioned potential to derive a differential potential, means to convert the differential unidirectional potential into a fluctuating potential of one phase or of opposite phase depending upon the polarity of said differential potential, electronic valve means to amplify said fluctuating potential, means conductively coupling the output circuit of said electronic valve means to the input circuit of said electronic valve to increase and decrease the potential drop across said first mentioned resistance in accordance with the phase of said fluctuating current and thereby in accordance with the polarity of said differential potential to reduce said differential potential, and means to measure the magnitude of the current flow through said second resistance.

17. Self-balancing apparatus for measuring the magnitude of a unidirectional potential including a unidirectional potential of relatively fixed magnitude, a resistance, a single electronic valve having an input circuit and an output circuit in which said resistance is connected, a source of direct current potential to energize the output circuit of said valve to produce a unidirectional current flow through said resistance and thereby a unidirectional potential drop across said resistance, a circuit to oppose said second and third potential, a second resistance connected in said circuit in series with said opposed potentials whereby current flows through said second resistance in one direction or the other to create a potential drop thereacross of one polarity or of opposite polarity depending upon which of said second and third mentioned potentials is the greater, means to oppose the potential drop across said second resistance to said first mentioned potential to derive a differential potential, means to convert the differential unidirectional potential into a fluctuating potential of one phase or of opposite phase depending upon the polarity of the differential potential, electronic valve means to amplify said fluctuating potential, means conductively coupling the output circuit of said electronic valve means to the input circuit of said electronic valve to increase and decrease the potential drop across said first mentioned resistance in accordance with the phase of said fluctuating current and thereby in accordance with the polarity of said differential potential to reduce the magnitude of the current flow through said second resistance.

18. Control apparatus including in combination means to produce a unidirectional potential varying in accordance with the variations in magnitude of a variable condition, a source of unidirectional potential of known magnitude, means to oppose said potentials to derive a differential unidirectional potential, physically stationary means controlled by said differential potential to regulate the magnitude of said second mentioned potential to reduce the magnitude of said differential potential and to produce a unidirectional potential varying in accordance with the variations in magnitude of said first mentioned unidirectional potential, an electrical network, means to impress the potential produced by said physically stationary means on said network, control means responsive to change in the potential applied to said network to control said condition in the direction to counteract the condition change causing the change in said last mentioned potential, follow-up means independent of said control means and responsive to a change in the potential applied to said network to at least partially neutralize said change, and reset means associated with said follow-up means to produce a further change in said last mentioned potential in the same direction.

19. Control apparatus including in combination means to produce a unidirectional potential varying in accordance with the variations in magnitude of a variable condition, a source of unidirectional potential of known magnitude, means to oppose said potentials to derive a differential unidirectional potential, physically stationary means controlled by said differential potential to regulate the magnitude of said second mentioned potential to reduce the magnitude of said differential potential and to produce a unidirectional potential varying in accordance with the variations in magnitude of said first mentioned unidirectional potential, an electrical network, means to impress the potential produced by said physically stationary means on said network, control means responsive to change in the potential applied to said network to control said condition in the direction to counteract the condition change causing the change in said last mentioned potential, follow-up means independent of said control means and responsive to a change in the potential applied to said network to at least partially neutralize said change, and reset means including an electrical reactance associated with said follow-up means to produce a further change in said last mentioned potential in the same direction.

20. Control apparatus including in combination means to produce a unidirectional potential varying in accordance with the variations in magnitude of a variable condition, a source of unidirectional potential of known magnitude, means to oppose said potentials to derive a differential unidirectional potential, means to convert said differential potential into a fluctuating potential, means to amplify said fluctuating potential, electronic valve reconversion means controlled by said amplified fluctuating potential to regulate the magnitude of said known unidirectional potential to reduce the magnitude of said differential potential and to produce a unidirectional potential varying in accordance with the variations in magnitude of said first mentioned unidirectional potential but of increased amplitude, an electrical network, means to impress the potential produced by said reconversion means on said network, control means responsive to change in the potential applied to said network to control said condition in the direction to counteract the condition change causing the change in said last mentioned potential, follow-up means independent of said control means and responsive to a change in the potential applied to said network to at least partially neutralize said change, and reset means associated with said follow-up means to produce a further change in said last mentioned potential in the same direction.

21. Control apparatus including in combination means to produce a unidirectional potential varying in accordance with the variations in magnitude of a variable condition, a source of unidirectional potential of known magnitude, means to oppose said potentials to derive a differential unidirectional potential, means to convert said differential potential into a fluctuating potential, means to amplify said fluctuating potential, electronic valve reconversion means controlled by said amplified fluctuating potential to regulate the magnitude of said known unidirectional potential to reduce the magnitude of said differential potential and to produce a unidirectional potential varying in accordance with the variations in magnitude of said first mentioned unidirectional potential but of increased amplitude, an electrical network, means to impress the potential produced by said reconversion means on said network, control means responsive to change in the potential applied to said network to control said condition in the direction to counteract the condition change causing the change in said last mentioned potential, follow-up means independent of said control means and responsive to a change in the potential applied to said network to at least partially neutralize said change, and reset means including an electrical reactance associated with said follow-up means to produce a further change in said last mentioned potential in the same direction.

THOMAS R. HARRISON.